United States Patent
Komoda et al.

(10) Patent No.: US 11,273,839 B2
(45) Date of Patent: Mar. 15, 2022

(54) VEHICLE CONTROL DEVICE

(71) Applicant: TOYOTA JIDOSHA KABUSHIKI KAISHA, Toyota (JP)

(72) Inventors: Takahiro Komoda, Nagoya (JP); Kenji Gotoda, Nagakute (JP); Hiroki Kuwamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 702 days.

(21) Appl. No.: 16/247,093

(22) Filed: Jan. 14, 2019

(65) Prior Publication Data

US 2019/0217852 A1 Jul. 18, 2019

(30) Foreign Application Priority Data

Jan. 12, 2018 (JP) .............................. JP2018-003740

(51) Int. Cl.
*B60W 50/00* (2006.01)
*B60W 10/08* (2006.01)
(Continued)

(52) U.S. Cl.
CPC ............ *B60W 50/00* (2013.01); *B60W 10/06* (2013.01); *B60W 10/08* (2013.01); *B60W 20/17* (2016.01);
(Continued)

(58) Field of Classification Search
CPC ...... B60W 50/00; B60W 20/17; B60W 10/06; B60W 10/08; B60W 2030/206; B60W 2050/0052; B60W 2510/0638; B60W 2710/081; B60W 2050/0057; G01M 15/046; G01M 15/11
See application file for complete search history.

(56) References Cited

U.S. PATENT DOCUMENTS

| 10,604,146 B2* | 3/2020 | Gotoda | ..................... B60K 6/20 |
| 2009/0151469 A1* | 6/2009 | Suzuki | ................... B60K 6/365 73/847 |

(Continued)

FOREIGN PATENT DOCUMENTS

| JP | 2009-144561 A | 7/2009 |
| JP | 2016-107673 A | 6/2016 |

*Primary Examiner* — Richard W Ridley
*Assistant Examiner* — Aimee T Nguyen
(74) *Attorney, Agent, or Firm* — Oliff PLC

(57) ABSTRACT

A vehicle control device for a vehicle, the vehicle including a rotation lock mechanism preventing rotation of a coupling portion on the engine side of the rotating member in at least one direction, and an engine rotation speed sensor detecting a rotation speed of the engine, includes: a characteristic detecting portion detecting at least a torsional rigidity as the rotational characteristic by applying a torque to the rotating member from the electric motor to measure a twist angle of the rotating member while the rotation of the coupling portion is prevented by the rotation lock mechanism; and an engine rotation filtering portion calculating an actual resonance frequency based on the torsional rigidity detected by the characteristic detecting portion and filtering an engine rotation speed signal supplied from the engine rotation speed sensor to attenuate a vibration component of the actual resonance frequency in the engine rotation speed signal.

15 Claims, 15 Drawing Sheets

(51) Int. Cl.
  *G01M 15/11*   (2006.01)
  *G01M 15/04*   (2006.01)
  *B60W 10/06*   (2006.01)
  *B60W 20/17*   (2016.01)
  *G05D 16/02*   (2006.01)
  *B60W 30/20*   (2006.01)

(52) U.S. Cl.
  CPC .......... *G01M 15/046* (2013.01); *G01M 15/11* (2013.01); *B60W 2030/206* (2013.01); *B60W 2050/0052* (2013.01); *B60W 2510/0638* (2013.01); *B60W 2710/081* (2013.01); *G05D 16/02* (2013.01)

(56) References Cited

U.S. PATENT DOCUMENTS

| | | | |
|---|---|---|---|
| 2012/0081051 A1* | 4/2012 | Kobayashi | B60K 6/48 318/400.23 |
| 2012/0083953 A1* | 4/2012 | Izawa | B60W 20/40 701/22 |
| 2017/0267229 A1* | 9/2017 | Hashimoto | B60W 30/20 |
| 2018/0105160 A1* | 4/2018 | Yang | B60W 30/20 |
| 2018/0134278 A1 | 5/2018 | Gotoda | |
| 2018/0148039 A1* | 5/2018 | Jung | B60K 6/48 |

* cited by examiner

VEHICLE CONTROL DEVICE

The disclosure of Japanese Patent Application No. 2018-003740 filed on Jan. 12, 2018 including the specification, drawings and abstract is incorporated herein by reference in its entirety.

BACKGROUND OF THE INVENTION

Field of the Invention

The present invention relates to a vehicle control device and, more particularly, to an improvement of a vehicle control device providing various controls in consideration of rotational characteristics of a rotating member such as a damper device.

Description of the Related Art

There is known a vehicle that includes an engine, an electric motor, and a rotating member disposed between the engine and the electric motor and having rotational characteristics related to an input torque. For example, the rotating member is a damper device absorbing rotational vibration of the engine or a power transmission shaft having predetermined rigidity, and the rotational characteristics are a rigidity value (torsional rigidity) corresponding to a rate of a change in the input torque to a change in twist angle, a hysteresis that is a difference in the input torque when the twist angle increases and decreases, a backlash dimension that is a change amount of the twist angle at the time of reversal between positive and negative in the input torque, etc. In some cases, power performance, vibration, noise, etc. are affected by the rotational characteristics of the rotating member. In Patent Document 1, to prevent resonance from occurring in a vehicle due to rigidity of a damper device when an electric motor is used as a drive power source for running, a technique is proposed for changing a torque of the electric motor so as to change the rigidity value of the damper device based on a relationship (rotational characteristics) between the input torque and the rigidity value of the damper device.

CITATION LIST

Patent Document 1: Japanese Laid-Open Patent Publication No. 2016-107673

SUMMARY OF THE INVENTION

Technical Problem

In a resonance frequency region determined depending on a torsional rigidity of the rotating member, an engine rotation speed accompanied by rotational vibration due to explosion etc. is significantly vibrated due to resonance, and therefore, for example, it is conceivable that a vibration component of a resonance frequency is attenuated by a filter etc. from a signal indicative of a detected engine rotation speed before the signal is used for subsequent control. However, if the torsional rigidity varies due to an individual difference, a temporal change, etc. of the rotating member, the resonance frequency is changed so that the vibration component attributable to resonance cannot properly be attenuated from the engine rotation speed signal in some cases.

The present invention was conceived in view of the situations and it is therefore an object of the present invention to provide an engine rotation speed signal having a properly reduced vibration component of a resonance frequency determined depending on a torsional rigidity of a rotating member regardless of variations in rotational characteristics (particularly torsional rigidity) due to an individual difference, etc. of the rotating member.

Solution to Problem

To achieve the above object, a first aspect of the present invention provides a vehicle control device for a vehicle including an engine, an electric motor, and a rotating member disposed between the engine and the electric motor with a rotational characteristic related to an input torque, (a) the vehicle including a rotation lock mechanism preventing rotation of a coupling portion on the engine side of the rotating member in at least one direction, and an engine rotation speed sensor detecting a rotation speed of the engine, the vehicle control device comprising: (b) a characteristic detecting portion detecting at least a torsional rigidity as the rotational characteristic by applying a torque to the rotating member from the electric motor to measure a twist angle of the rotating member while the rotation of the coupling portion is prevented by the rotation lock mechanism; and (c) an engine rotation filtering portion calculating an actual resonance frequency based on the torsional rigidity detected by the characteristic detecting portion and filtering an engine rotation speed signal supplied from the engine rotation speed sensor to attenuate a vibration component of the actual resonance frequency in the engine rotation speed signal.

A second aspect of the present invention provides the vehicle control device recited in the first aspect of the invention, comprising (a) a filter correcting portion making a correction based on a frequency difference between the actual resonance frequency and a predefined set resonance frequency for a reference filter characteristic related to an attenuation frequency band and an attenuation gains defined in advance depending on the set resonance frequency, wherein (b) the engine rotation filtering portion filters the engine rotation speed signal in accordance with a corrected filter characteristic which is obtained after the reference filter characteristic is corrected by the filter correcting portion.

A third aspect of the present invention provides the vehicle control device recited in the second aspect of the invention, wherein when the frequency difference between the actual resonance frequency and the set resonance frequency is equal to or greater than a predefined magnitude determination value, the filter correcting portion corrects the attenuation frequency band of the reference filter characteristic to move in a deviation direction of the resonance frequency, and wherein when the frequency difference is smaller than the magnitude determination value, the filter correcting portion makes an emphasis correction by increasing the attenuation gain of the reference filter characteristic and narrowing the attenuation frequency band.

A fourth aspect of the present invention provides the vehicle control device recited in any one of the first to third aspects of the invention, comprising an engine rotational drive portion providing a predefined control by using the engine rotation speed signal filtered by the engine rotation filtering portion when the engine is rotationally driven via the rotating member by the electric motor.

A fifth aspect of the present invention provides the vehicle control device recited in any one of the first to third aspects of the invention, comprising a misfire detecting portion making a misfire determination of the engine based on a rotational fluctuation in the engine rotation speed signal filtered by the engine rotation filtering portion during operation of the engine.

A sixth aspect of the present invention provides the vehicle control device recited in any one of the first to third aspects of the invention, comprising an abnormal-noise detecting portion making an abnormal noise determination of a power transmission path based on a rotational fluctuation in the engine rotation speed signal filtered by the engine rotation filtering portion during operation of the engine.

A seventh aspect of the present invention provides a vehicle control device for a vehicle including an engine, an electric motor, and a rotating member disposed between the engine and the electric motor with a rotational characteristic related to an input torque (a) the vehicle including a rotation lock mechanism preventing rotation of a coupling portion on the engine side of the rotating member in at least one direction, and an engine rotation speed sensor detecting a rotation speed of the engine, the vehicle control device comprising: (b) a characteristic detecting portion detecting at least a torsional rigidity as the rotational characteristic by applying a torque to the rotating member from the electric motor to measure a twist angle of the rotating member while the rotation of the coupling portion is prevented by the rotation lock mechanism; and (c) an electric motor rotational fluctuation imparting portion calculating an actual resonance frequency based on the torsional rigidity detected by the characteristic detecting portion and periodically fluctuating a target rotation speed of the electric motor depending on the actual resonance frequency to suppress a rotational vibration of the engine caused by the actual resonance frequency when the engine is rotated via the rotating member by the electric motor.

An eighth aspect of the present invention provides the vehicle control device recited in the seventh aspect of the invention, comprising (a) a fluctuation characteristic correcting portion making a correction based on a frequency difference between the actual resonance frequency and a predefined set resonance frequency for a reference fluctuation characteristic defined in advance depending on the set resonance frequency in relation to an amplitude and a fluctuation frequency band of a periodic fluctuation imparted to the target rotation speed, wherein (b) the electric motor rotational fluctuation imparting portion periodically fluctuates the target rotation speed in accordance with a fluctuation characteristic after the reference fluctuation characteristic is corrected by the fluctuation characteristic correcting portion.

A ninth aspect of the present invention provides the vehicle control device recited in the eighth aspect of the invention, wherein when the frequency difference between the actual resonance frequency and the set resonance frequency is equal to or greater than a predefined magnitude determination value, the fluctuation characteristic correcting portion corrects the fluctuation frequency band of the reference fluctuation characteristic to move in a deviation direction of the resonance frequency, and wherein when the frequency difference is smaller than the magnitude determination value, the fluctuation characteristic correcting portion makes an emphasis correction by increasing the amplitude of the reference fluctuation characteristic and narrowing the fluctuation frequency band.

Advantageous Effects of Invention

In the vehicle control device as described above, the torsional rigidity is detected by applying the torque to the rotating member from the electric motor to measure the twist angle while the rotation of the coupling portion on the engine side of the rotating member is locked by the rotation lock mechanism, and the actual resonance frequency is calculated based on the detected torsional rigidity. Therefore, the actual resonance frequency can properly be calculated based on the actual torsional rigidity regardless of variations in torsional rigidity due to individual differences etc. of the rotating member. The filtering is then performed, in the first aspect of the invention, to attenuate the vibration component of the actual resonance frequency in the engine rotation speed signal, so that the vibration component attributable to resonance is properly reduced in the obtained engine rotation speed signal. Further, in the seventh aspect of the invention, when the engine is rotated by the electric motor, the target rotation speed of the electric motor is periodically fluctuated depending on the actual resonance frequency to suppress the rotational vibration of the engine caused by the actual resonance frequency, so that the rotational vibration itself of the engine due to the resonance is suppressed, and therefore, the vibration component attributable to the resonance is properly reduced in the obtained engine rotation speed signal. Therefore, in either case of the first aspect of the present invention or the seventh aspect of the present invention, the subsequent control using the engine rotation speed signal is properly provided.

In the vehicle control device recited in the second aspect of the invention, a correction is made based on the frequency difference for the reference filter characteristic related to the attenuation frequency band and the attenuation gain defined in advance depending on the set resonance frequency, and the engine rotation speed signal is filtered in accordance with the corrected filter characteristic which is obtained after the correction, so that the vibration component attributable to resonance is properly reduced.

In the vehicle control device recited in the third aspect of the invention, if the frequency difference is large, the attenuation frequency band of the reference filter characteristic is corrected to move in the deviation direction of the resonance frequency, so that the vibration component attributable to resonance is properly reduced from the engine rotation speed signal even if the frequency difference is large. On the other hand, if the frequency difference is small, the attenuation gain of the reference filter characteristic is increased and the attenuation frequency band is narrowed to make an emphasis correction, and therefore, only the vibration component attributable to resonance can more properly be reduced from the engine rotation speed signal.

The vehicle control device recited in the fourth aspect of the invention provides a predefined control by using the filtered engine rotation speed signal when the engine is rotationally driven via the rotating member by the electric motor and therefore, the engine rotation speed can highly accurately be controlled, or it can highly accurately be determined that the engine rotation speed has reached a predetermined determination value, without being affected by the engine rotation vibration due to resonance, so that the control using the engine rotation speed signal is properly provided.

The vehicle control device recited in the fifth aspect of the invention makes the misfire determination of the engine during the operation of the engine based on the rotational fluctuation of the engine rotation speed signal, wherein the determination is made by using the filtered engine rotation speed, so that the misfire determination is properly made with high accuracy without being affected by engine rotational vibration due to resonance.

The vehicle control device recited in the sixth aspect of the invention makes the abnormal noise determination of the power transmission path during the operation of the engine based on the rotational fluctuation of the engine rotation speed signal, wherein the determination is made by using the filtered engine rotation speed, so that the abnormal noise determination is properly made with high accuracy without being affected by engine rotational vibration due to resonance.

The vehicle control device recited in the eighth aspect of the invention makes a correction based on the frequency difference for the reference fluctuation characteristic related to the amplitude and the fluctuation frequency band defined in advance depending on the set resonance frequency, and the target rotation speed of the electric motor is periodically fluctuated in accordance with the fluctuation characteristic after the correction, so that the rotational vibration itself of the engine due to resonance is properly suppressed, and the vibration component attributable to the resonance is properly reduced in the obtained engine rotation speed signal.

In the vehicle control device recited in the ninth aspect of the invention, if the frequency difference is relatively large, the fluctuation frequency band of the reference fluctuation characteristic is corrected to move in the deviation direction of the resonance frequency, so that the rotational vibration of the engine due to resonance is properly suppressed even if the frequency difference is large. On the other hand, if the frequency difference is small, the amplitude of the reference fluctuation characteristic is increased and the fluctuation frequency band is narrowed to make an emphasis correction, and therefore, the rotational vibration of the engine due to resonance can more properly be reduced.

DESCRIPTION OF THE PREFERRED EXAMPLES

Figure 1:
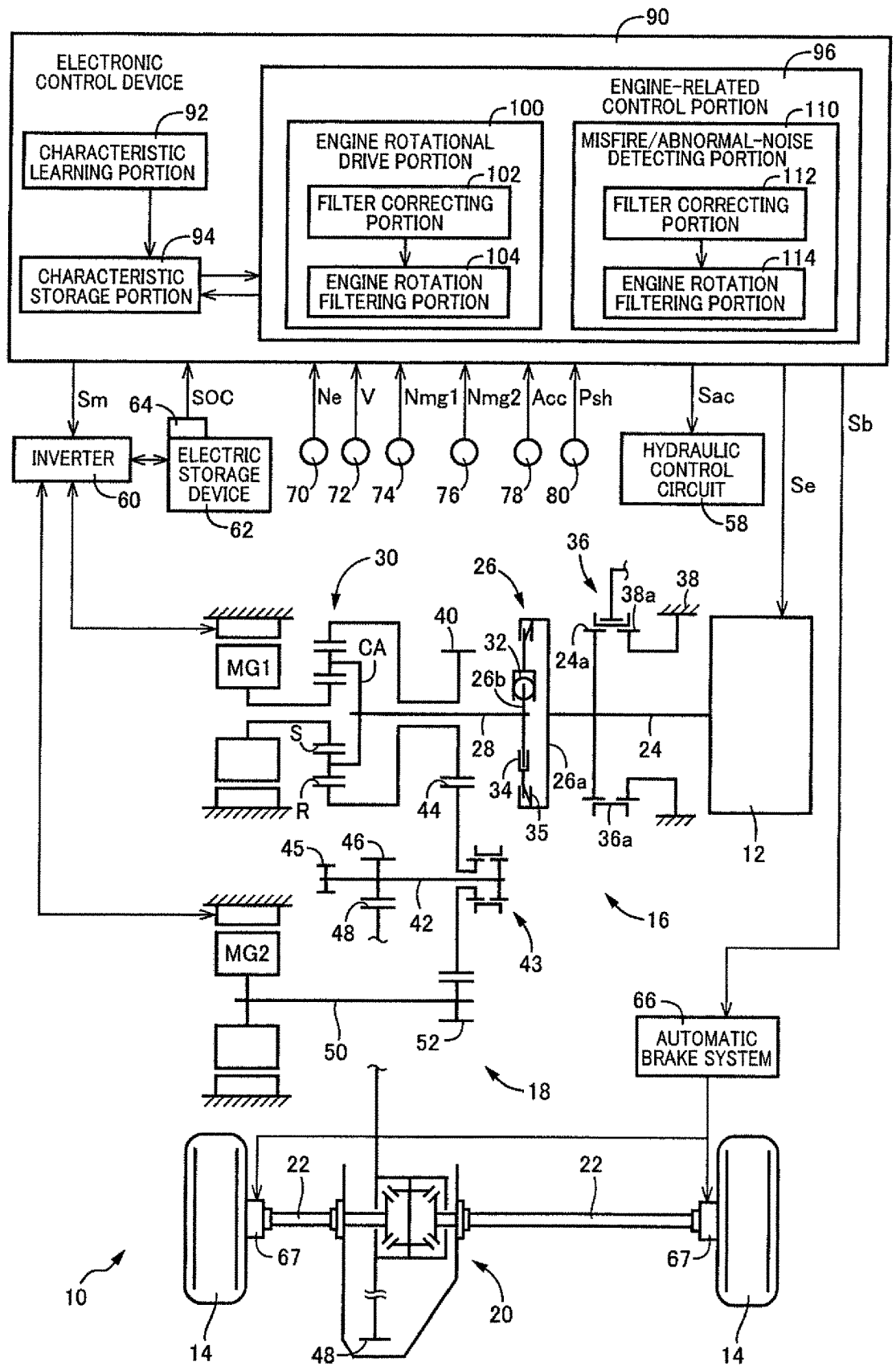
FIG. 1 is a skeleton diagram for explaining a drive system of a hybrid vehicle to which the present invention is applied, showing main portions of the control system together.

The engine is an internal combustion engine generating power from combustion of a fuel such as a gasoline engine and a diesel engine and has a rotational vibration occurring due to explosion etc., and the rotational vibration may be amplified by resonance of a rotating member having a torsional rigidity such as a damper device. For the electric motor, a motor generator also usable as an electric generator is suitably used. The rotating member having rotational characteristics for an input torque is a damper device absorbing rotational vibration of the engine or a power transmission shaft having predetermined torsional rigidity, for example. The damper device includes an elastic body such as a spring and a friction mechanism, for example, or may include only the elastic body. The rotational characteristics for an input torque of the rotating member are a rigidity value of torsional rigidity corresponding to a rate of a change in the input torque to a change in twist angle, a hysteresis that is a difference in the input torque when the twist angle increases and decreases, a backlash dimension that is a change amount of the twist angle at the time of reversal between positive and negative in the input torque, etc., and at least include the torsional rigidity. Although the rigidity value is appropriate for the torsional rigidity, other physical quantities corresponding to the rigidity value may also be used.

For the rotation lock mechanism preventing rotation of the coupling portion on the engine side of the rotating member in the at least one direction, a friction brake of a hydraulic type etc., a meshing brake, or a one-way clutch etc. is suitably used. In the case of the one-way clutch, for example, the one-way clutch is disposed to prevent the rotation in a reverse rotation direction of the engine, otherwise, when power transmission between the engine and the rotating member is interrupted by a clutch etc., the rotation may be prevented in one arbitrary direction. The characteristic detecting portion detecting the rotational characteristics of the rotating member desirably detects the characteristic, for example, while the vehicle is stopped with the engine stopped and a vehicle speed being zero or can detect the characteristic during motor running while the second electric motor is used as the drive power source for running with the engine stopped. The detection may simply be executed at the time of vehicle inspection and the detected characteristic may be stored or may periodically be executed and updated (learned) based on a predetermined running distance or a running time and the detected characteristic may be successively replaced or used for learning, and other various forms are available. If temporal changes have a large influence, it is desirable to execute the learning periodically based on certain conditions.

If a drive power is generated when the rotational characteristics are detected, it is desirable to control the torque of the second electric motor usable as a drive power source to offset the drive power; however, in the case of detection of the rotational characteristics during stop of the vehicle, for example, the detection may be performed on condition that a depressing operation of a brake is performed, that a shift lever is operated to a P (parking) position to put a parking gear into an engaged state, or that a parking brake is in operation. If the vehicle includes an automatic brake system which automatically controls a brake force of a wheel brake, the wheel brake may be actuated. If a drive power fluctuation including that detected during running of the vehicle is slight, or in the case of the detection before the shipment of the vehicle or during vehicle inspecting, the offset control of the drive power may be omitted. The offset control may not necessarily completely eliminate the drive power fluctuation, and the drive power fluctuation is may be reduced.

The present invention is applied to, for example, a vehicle having a differential mechanism distributing an output of an engine to an electric motor and a driving wheel side and may be applied to various vehicles such as a vehicle having an engine and an electric motor connected in series across a rotating member such as a damper device and a vehicle transmitting outputs of an engine and an electric motor combined by a planetary gear device etc. toward driving wheels. A transmission gear and a connecting/disconnecting device such as a clutch etc. may be disposed as needed between the engine and the rotating member as well as between the rotating member and the electric motor. If the engine and the rotating member are directly coupled via a coupling shaft etc., the rotation in at least one direction prevented by the rotation lock mechanism is determined such that reverse rotation of the engine is prevented, and the characteristic detecting portion applies a torque in the reverse rotation direction to the rotating member; however, if the connecting/disconnecting device is disposed between the engine and the rotating member, the direction of the rotation of the rotating member to be prevented is not particularly limited. If rotation is prevented in both directions by the rotation lock mechanism, the direction of the torque applied to the rotating member is not necessarily limited at the time of the detection by the characteristic detecting portion. The rotational characteristics can be obtained also by changing the torque in both positive and negative directions.

The engine rotation filtering portion and the electric motor rotational fluctuation imparting portion can calculate an actual resonance frequency in accordance with a map, arithmetic expression, etc. defined in advance based on the torsional rigidity and an inertia moment detected by the characteristic detecting portion, for example. The inertia moment is set in advance based on the mass and size of the engine, the rotating member, and a flywheel, for example. The engine rotation filtering portion is configured to correct a filter characteristic of filtering of the engine rotation speed signal, for example, a reference filter characteristic determined in advance depending on a set resonance frequency, based on the frequency difference between the actual resonance frequency and the set resonance frequency; however, the filter characteristic can be selected or set based only on the actual resonance frequency. When the reference filter characteristic is corrected based on the frequency difference between the actual resonance frequency and the set resonance frequency, the form of correction can be changed depending on the magnitude of the frequency difference; however, the correction can always be made in a constant form regardless of the magnitude of the frequency difference and, for example, the attenuation frequency band may merely be shifted depending on the frequency difference, or both the attenuation gain and the attenuation frequency band may be changed depending on the frequency difference, and various other forms are available.

For example, when the engine is rotationally driven and cranked by the electric motor at the start of the engine, the engine rotation speed signal filtered by the engine rotation filtering portion is suitably used when it is determined whether a termination determination value for terminating the cranking has been reached or when a determination is made on misfire of the engine or on an abnormal noise of a power transmission path (an engine state in which abnormal noise is generated) based on the rotational fluctuation of the engine rotation speed signal during operation of the engine. The filtered engine rotation speed signal can also be used for various engine-related controls for providing a control based on the engine rotation speed, a control using the engine rotation speed, etc. when the engine rotation speed is changed across a resonance frequency band of the rotating member or when the engine is operated in the vicinity of the resonance frequency band, for example. The attenuation frequency band and the attenuation gain of the filter characteristic for filtering the engine rotation speed signal are individually appropriately determined depending on a purpose of use etc. of the engine rotation speed signal, or the engine rotation speed signal filtered with the same filter characteristic may be usable in multiple controls.

The electric motor rotational fluctuation imparting portion is configured to correct a fluctuation characteristic of a periodic fluctuation imparted to the target rotation speed of the electric motor, for example, a reference fluctuation characteristic determined in advance depending on the set resonance frequency, based on the frequency difference between the actual resonance frequency and the set resonance frequency; however, the fluctuation characteristic can be selected or set based only on the actual resonance frequency. When the reference fluctuation characteristic is corrected based on the frequency difference between the actual resonance frequency and the set resonance frequency, the form of correction can be changed depending on the magnitude of the frequency difference; however, the correction can always be made in a constant form regardless of the magnitude of the frequency difference and, for example, the fluctuation frequency band may merely be shifted depending on the frequency difference, or both the amplitude and the fluctuation frequency band may be changed depending on the frequency difference, and various other forms are available.

The present invention is suitably applied to, for example, a hybrid vehicle that includes a differential mechanism distributing the output of the engine to the electric motor and the driving wheel side and a damper device disposed as the rotating member between the engine and the differential mechanism and that can use the engine as the drive power source for running through the torque control of the electric motor and is also applicable to a series hybrid vehicle in which the engine is exclusively used for rotationally driving an electric generator to generate electricity. In such a hybrid vehicle, for example, a second electric motor usable as a drive power source is disposed as needed in a power transmission path between the differential mechanism and the driving wheels or at another power transmission position.

EXAMPLE

An example of the present invention will now be described in detail below with reference to the drawings.

FIG. 1 is a skeleton diagram for explaining a drive system of a hybrid vehicle 10 to which the present invention is applied, showing main portions of the control system together. The hybrid vehicle 10 has, for example, a transversely-mounted drive system of an FF (front-engine front-wheel drive) type etc. and includes in a power transmission path between an engine 12 and a pair of left and right driving wheels 14, a first drive portion 16, a second drive portion 18, a final reduction gear 20, a pair of left and right axles 22, etc. The engine 12 is an internal combustion engine such as a gasoline engine and a diesel engine and has a crankshaft 24 to which a damper device 26 absorbing a torque fluctuation is coupled. The damper device 26 includes a first rotating element 26a coupled to the crankshaft 24 and a second rotating element 26b coupled via an input shaft 28 to a differential mechanism 30 with multiple types of springs 32 and a friction mechanism 34 interposed between the first rotating element 26a and the second rotating element 26b, so that a rigidity value (spring constant) corresponding to a rate of a change in input torque Tin to a change in twist angle 1 is changed stepwise. A torque limiter 35 is disposed on an outer circumferential end portion of the damper device 26. The damper device 26 corresponds to a rotating member having rotational characteristics related to the input torque Tin, and the first rotating element 26a corresponds to a coupling portion of the damper device 26 on the engine 12 side.

The crankshaft 24 integrally coupled to the first rotating element 26a is coupled to a housing 38 via a meshing brake 36 so that rotation is prevented. The meshing brake 36 has meshing teeth 24a disposed on the crankshaft 24, meshing teeth 38a disposed on the housing 38, and a meshing sleeve 36a having an inner circumferential surface provided with meshing teeth capable of meshing simultaneously with both the meshing teeth 24a, 38a, and the meshing sleeve 36a is moved in an axial direction so that the crankshaft 24 is switched between a state in which the crankshaft 24 is relatively non-rotatably engaged with the housing 38 and a state in which the crankshaft 24 is released from the housing 38 and made freely rotatable. For example, an electromagnetic switching valve etc. disposed in a hydraulic control circuit 58 is switched in accordance with a hydraulic control signal Sac supplied from an electronic control device 90, so that the meshing sleeve 36a is moved in the axial direction via a hydraulic cylinder etc. to engage and release the meshing brake 36. Alternatively, the meshing sleeve 36a can be moved in the axial direction by using another drive device such as an electric feed screw mechanism. The meshing brake 36 is provided with a synchronizing mechanism of a cone type etc. as needed. The meshing brake 36 corresponds to a rotation lock mechanism, and instead of the meshing brake 36, a friction brake or a one-way clutch which prevents the engine 12 from rotating in only the reverse rotation direction can be employed as the rotation lock mechanism. An engine connecting/disconnecting clutch capable of enabling/disenabling power transmission can be disposed between the engine 12 and the meshing teeth 24a.

The first drive portion 16 is configured to include a first motor generator MG1 and an output gear 40 in addition to the engine 12, the differential mechanism 30, and the meshing brake 36. The differential mechanism 30 is a single pinion type planetary gear device and includes a sun gear S, a ring gear R, and a carrier CA as three rotating elements in a differentially rotatable manner; the first motor generator MG1 is coupled to the sun gear S; the input shaft 28 is coupled to the carrier CA; and the output gear 40 is coupled to the ring gear R. Therefore, a torque transmitted from the engine 12 via the damper device 26 to the carrier CA of the differential mechanism 30 is distributed by the differential mechanism 30 to the first motor generator MG1 and the output gear 40, and when a rotation speed (MG1 rotation speed) Nmg1 of the first motor generator MG1 is controlled through regenerative control etc., a rotation speed (engine rotation speed) Ne of the engine 12 is continuously variably changed and output from the output gear 40. Therefore, the differential mechanism 30 and the first motor generator MG1 function as an electric continuously variable transmission. The first motor generator MG1 alternatively functions as an electric motor or an electric generator and is connected through an inverter 60 to an electric storage device 62 such as a battery.

On the other hand, when the first motor generator MG1 is rotationally driven in a negative rotation direction opposite to a running direction of the engine 12 while the rotation of the crankshaft 24 is prevented by the meshing brake 36, i.e., while a rotation of the carrier CA is prevented via the damper device 26, a torque is applied to the output gear 40 in the positive rotation direction (vehicle forward direction) same as the running direction of the engine 12 due to a reaction force generated by the meshing brake 36, and the output gear 40 is rotationally driven in the positive rotation direction. When the first motor generator MG1 is rotationally driven in the positive rotation direction same as the running direction of the engine 12, a torque is applied to the output gear 40 in the reverse rotation direction (vehicle reverse direction) opposite to the running direction of the engine 12 due to a reaction force generated by the meshing brake 36, and the output gear 40 is rotationally driven in the reverse rotation direction. In such a case, a torque of the first motor generator MG1 is amplified depending on a gear ratio ρ of the differential mechanism 30 and applied to the damper device 26 coupled to the carrier CA. The first motor generator MG1 is an electric motor capable of applying a torque to the damper device 26 via the differential mechanism 30.

Figure 2:
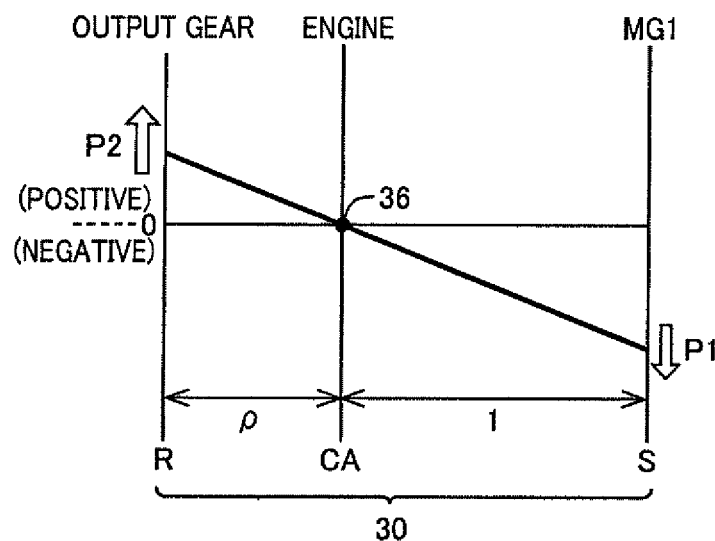
FIG. 2 is an example of a collinear chart of a differential mechanism of the hybrid vehicle of FIG. 1.

FIG. 2 is a collinear chart in which the three rotating elements of the differential mechanism 30, i.e., the sun gear S, the ring gear R, and the carrier CA, can be connected by a straight line in terms of rotation speed; the upward direction of FIG. 2 is the running direction of the engine 12, i.e., the positive rotation direction; and an intervals among the vertical axes are determined depending on the gear ratio ρ (=the number of teeth of the sun gear S/the number of teeth of the ring gear R) of the differential mechanism 30. For example, describing a case that the output gear 40 is rotationally driven in the vehicle forward direction by the first motor generator MG1, a torque of rotation in the negative rotation direction (the downward direction of FIG. 2) opposite to the running direction of the engine 12 is applied to the sun gear S as indicated by an arrow P1 through a power running control of the first motor generator MG1 while the rotation of the carrier CA is prevented by the meshing brake 36, and when the sun gear S is rotationally driven in the negative rotation direction, a torque of rotation in the positive rotation direction (the upward direction of FIG. 2) same as the running direction of the engine 12 is applied as indicated by an arrow P2 to the ring gear R to which the output gear 40 is coupled, so that a drive power is obtained in the forward direction.

Returning to FIG. 1, the output gear 40 is meshed with a large diameter gear 44 disposed on an intermediate shaft 42 parallel to the input shaft 28. A dog clutch 43 is disposed between the large diameter gear 44 and the intermediate shaft 42 so that a power transmission is selectively switched between to be enabled and disenabled. This dog clutch 43 is configured in the same way as the meshing brake 36 and has an engaged state and a disengaged state switched therebetween via a hydraulic cylinder etc. when another electromagnetic switching valve etc. disposed in the hydraulic control circuit 58 is switched in accordance with the hydraulic control signal Sac supplied from the electronic control device 90, so that the power transmission is enabled and disenabled between the large diameter gear 44 and the intermediate shaft 42. A small diameter gear 46 smaller in diameter than the large diameter gear 44 is disposed on the intermediate shaft 42, and the small diameter gear 46 is meshed with a differential ring gear 48 of the final reduction gear 20. Therefore, the rotation of the output gear 40 is reduced in speed depending on a ratio of the number of teeth between the output gear 40 and the large diameter gear 44 and a ratio of the numbers of teeth between the small diameter gear 46 and the differential ring gear 48 and transmitted to the final reduction gear 20 and is further transmitted from the pair of the axles 22 to the driving wheels 14 through a differential gear mechanism of the final reduction gear 20. A parking gear 45 is relatively non-rotatably disposed on the intermediate shaft 42, and when a parking range is selected by operation of a shift lever to a P position for parking etc., a parking lock pawl not shown is pressed against and meshed with the parking gear 45 in accordance with an urging force of a spring etc. so as to prevent rotation of members on the driving wheel 14 side from the intermediate shaft 42.

The second drive portion 18 is configured to include a second motor generator MG2 and a motor output gear 52 disposed on a motor shaft 50 of the second motor generator MG2, and the motor output gear 52 is meshed with the large diameter gear 44. Therefore, a rotation speed (MG2 rotation speed Nmg2) of the second motor generator MG2 is reduced depending on a ratio of the number of teeth between the motor output gear 52 and the large diameter gear 44 and a ratio of the number of teeth between the small diameter gear 46 and the differential ring gear 48 and transmitted to the final reduction gear 20 to rotationally drive the driving wheels 14 via the pair of the axles 22. The second motor generator MG2 alternatively functions as an electric motor and an electric generator and is connected through the inverter 60 to the electric storage device 62. The second motor generator MG2 corresponds to a second electric motor usable as a drive power source.

The hybrid vehicle 10 also includes an automatic brake system 66. The automatic brake system 66 electrically controls a brake force i.e. a brake hydraulic pressure, of each of wheel brakes 67 disposed on the driving wheels 14 and driven wheels (non-driving wheels) not shown in accordance with a brake control signal Sb supplied from the electronic control device 90. The wheel brake 67 is also supplied with a brake hydraulic pressure via a brake master cylinder when a brake pedal not shown is depressed, so that a brake force is mechanically generated depending on the brake hydraulic pressure, i.e., a brake operating force.

The hybrid vehicle 10 having the drive system configured as described above includes the electronic control device 90 as a controller providing various controls such as an output control of the engine 12, a torque control of the motor generators MG1, MG2, an engagement/release control of the meshing brake 36 and the dog clutch 43, a control of automatic braking by the automatic brake system 66. The electronic control device 90 includes a so-called microcomputer having a CPU, a RAM, a ROM, an input/output interface, etc. and executes a signal process according to a program stored in advance in the ROM, while utilizing a temporary storage function of the RAM to provide the various controls. The electronic control device 90 is supplied with signals indicative of various pieces of information required for control such as the engine rotation speed Ne, a vehicle speed V, the MG1 rotation speed Nmg1, the MG2 rotation speed Nmg2, an accelerator operation amount (accelerator pedal depression operation amount) Acc, a shift lever operation position Psh, and an electric storage remaining amount SOC of the electric storage device 62, from an engine rotation speed sensor 70, a vehicle speed sensor 72, an MG1 rotation speed sensor 74, an MG2 rotation speed sensor 76, an accelerator operation amount sensor 78, a shift position sensor 80, and an SOC sensor 64, respectively, for example. Examples of the shift lever operation position Psh include a D position for forward running, an R position for reverse running, the P position for parking, and an N position for neutral, and when the parking range is selected by operation to the P position, the parking lock pawl is meshed with the parking gear 45 disposed on the intermediate shaft 42 so that rotation of the parking gear 45 is mechanically prevented. The electronic control device 90 outputs, for example, an engine control signal Se for controlling an engine output through an electronic throttle valve, a fuel injection device, an ignition device, etc. of the engine 12, a motor control signal Sm for controlling torques (power running torque and regenerative torque) of the motor generators MG1 and MG2, the hydraulic control signal Sac switching the meshing brake 36 and the dog clutch 43 between engaged and disengaged states via the electromagnetic switching valve etc. of the hydraulic control circuit 58, and the brake control signal Sb controlling the brake force of the wheel brake 67 via the automatic brake system 66.

Figure 3:
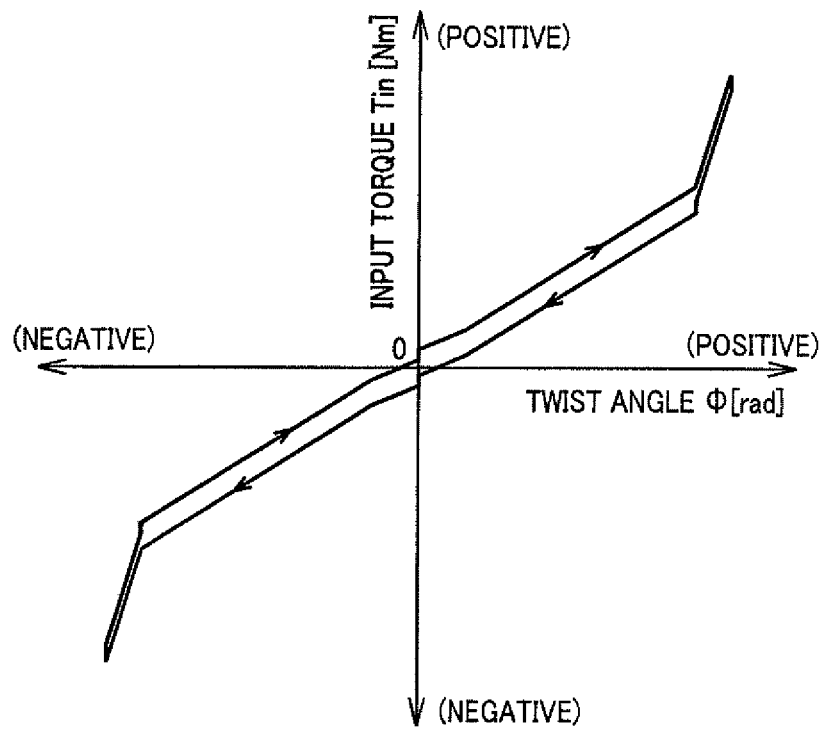
FIG. 3 is a diagram of an example of a relationship between an input torque Tin and a twist angle 1 of a damper device of FIG. 1.
Figure 4:
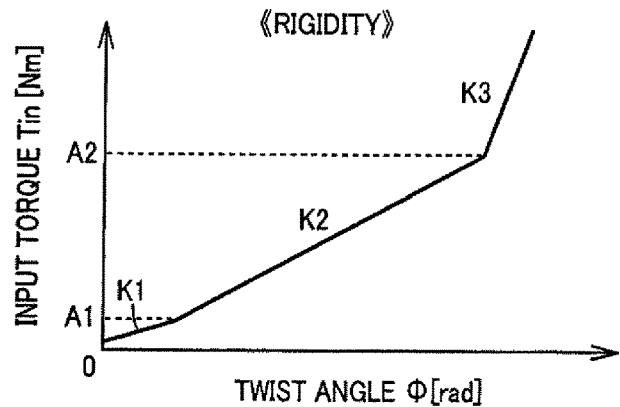
FIG. 4 is a view illustrating rigidity values K1, K2, K3 obtained from the relationship of FIG. 3.

The damper device 26 has a relationship between the input torque Tin and the twist angle $\Phi$, for example, as shown in FIG. 3, due to the action of the springs 32 and the friction mechanism 34 etc. Although FIG. 3 shows a symmetric change with respect to an origin O, the damper device 26 causing an asymmetric change is also employable. From the relationship between the input torque Tin and the twist angle $\Phi$, the rotational characteristic related to the torsional rigidity can be identified as shown in FIG. 4. The torsional rigidity is a change characteristic of the input torque Tin with respect to the twist angle $\Phi$ and has three kinds K1, K2, K3 of a rigidity value corresponding to a rate of a change $\Delta$Tin of the input torque Tin to a change $\Delta\Phi$ of the twist angle $\Phi$, i.e., $\Delta$Tin/$\Delta\Phi$, and the rigidity value changes at two change points A1, A2 different in the input torque Tin. Therefore, the rigidity value is K1 in a region of the input torque Tin equal to or less than A1, the rigidity value is K2 in a region from A1 to A2, and the rigidity value is K3 in a region greater than A2. The damper device 26 resonates in a predetermined frequency region determined depending on the rigidity values K1 to K3.

Figure 5:
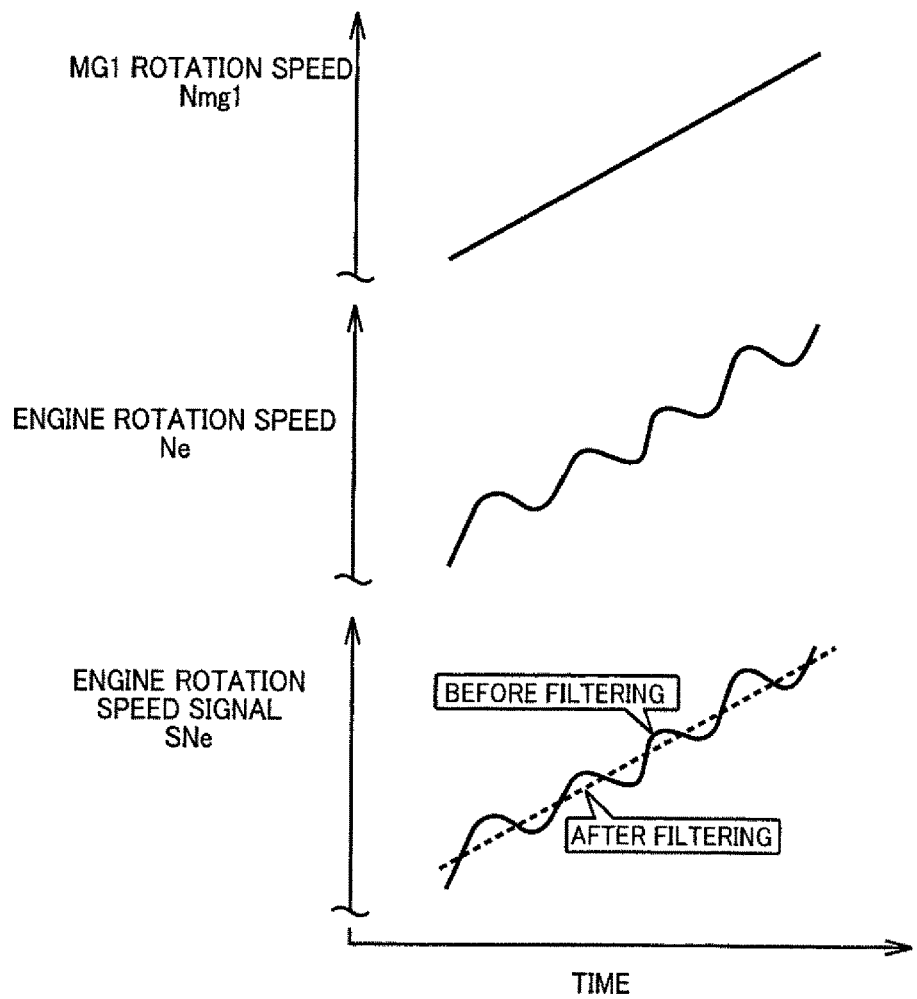
FIG. 5 is an example of a time chart in the case that filtering is performed to attenuate vibration of an engine rotation speed signal SNe due to resonance when an engine is rotationally driven to increase a rotation speed.

On the other hand, the engine 12 has rotational vibration generated by explosion etc., and the rotational vibration is amplified by resonance in the vicinity of the resonance frequency determined depending on the rigidity values K1 to K3 of the damper device 26. Therefore, an engine rotation speed signal SNe indicative of the engine rotation speed Ne detected by the engine rotation speed sensor 70 also includes vibration, and when various controls are provided by using the engine rotation speed signal SNe, a control accuracy may be impaired by the vibration. In this regard, it is conceivable that the engine rotation speed signal SNe is filtered depending on the torsional rigidity of the damper device 26 so as to attenuate a vibration component of the resonance frequency. FIG. 5 is an example of a time chart of the engine rotation speed signal SNe when the engine 12 is rotationally driven via the damper device 26 by the first motor generator MG1 to increase the engine rotation speed Ne. Since the engine rotation speed Ne has the vibration (pulsation) caused by resonance in the resonance frequency region of the damper device 26, the engine rotation speed signal SNe supplied from the engine rotation speed sensor 70 also has vibration as indicated by a solid line of FIG. 5; however, the signal SNe can be smoothed as indicated by a broken line of FIG. 5 by filtering determined depending on the torsional rigidity of the damper device 26 so as to attenuate the vibration due to resonance.

Figure 21:
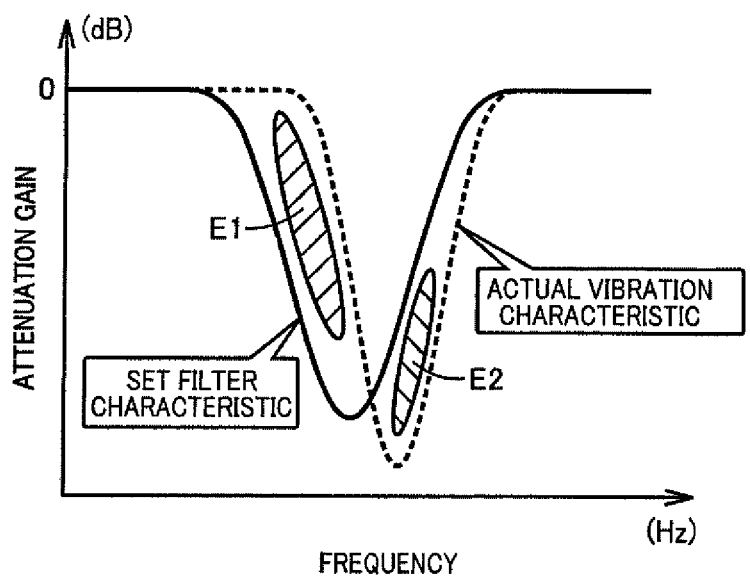
FIG. 21 is a diagram illustrating a case where a vibration characteristic due to actual resonance is deviated by a variation in torsional rigidity of the damper device with respect to a set characteristic of a filter for attenuating a vibration component attributable to resonance from an engine rotation speed signal.
Figure 22:
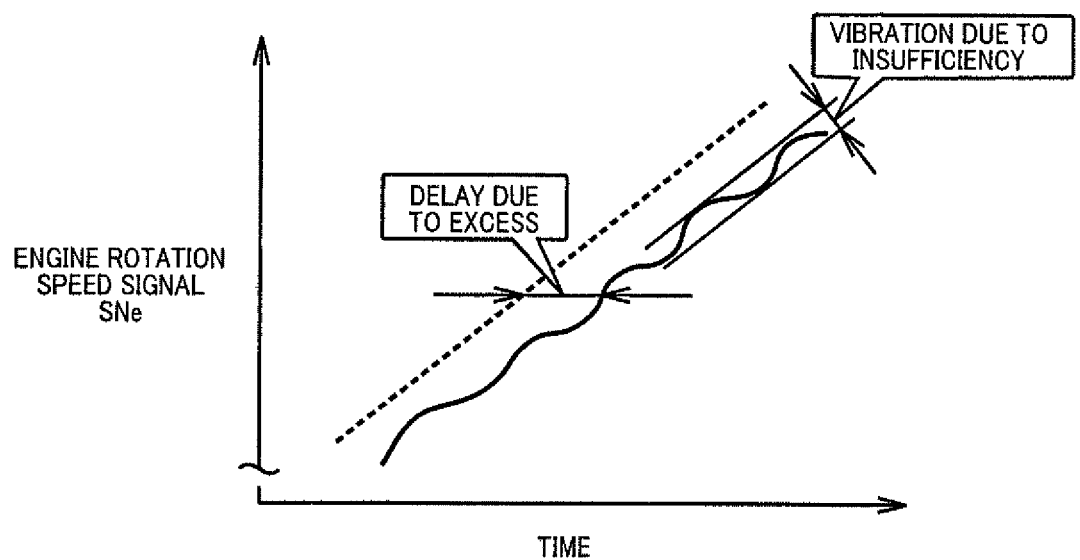
FIG. 22 is a diagram for explaining a delay and a vibration of the engine rotation speed signal SNe caused by deviation of the set filter characteristic shown in FIG. 21.

However, the rotational characteristics of the damper device 26, i.e., the rigidity values K1 to K3 and the change points A1, A2 related to the torsional rigidity, may vary due to individual differences of the damper device 26, i.e., dimensional errors of component parts and variations in spring constant of the springs 32, variations in friction coefficient of friction material of the friction mechanism 34, etc., and may change due to a temporal change. When the torsional rigidity varies as described above, the resonance frequency is changed so that the vibration component attributable to the resonance cannot properly be attenuated from the engine rotation speed signal SNe. Specifically describing with reference to FIGS. 21 and 22, a solid line of FIG. 21 is an example of a filter characteristic preset for filtering for attenuating the vibration component of the resonance frequency, and if a vibration characteristic of the rotational vibration caused by the actual resonance is deviated as indicated by a broken line of FIG. 21 from this set filter characteristic, an excessive portion E1 and an insufficient portion E2 are generated. If the excessive portion E1 and the insufficient portion E2 are generated as described above, the engine rotation speed signal SNe has a delay attributable to the excessive portion E1 as indicated by a solid line of FIG. 22 and has a remaining rotational vibration due to the insufficient portion E2. Therefore, the subsequent control using the engine rotation speed signal SNe may not properly be provided. A broken line of FIG. 22 indicates the engine rotation speed signal SNe when the vibration characteristic of the actual resonance substantially coincides with the set filter characteristic and the rotational vibration due to resonance is properly attenuated by filtering.

In this regard, the electronic control device 90 functionally includes a characteristic learning portion 92, a characteristic storage portion 94, and an engine-related control portion 96 and can filter the engine rotation speed signal SNe based on the actual torsional rigidity of the damper device 26 so as to provide various controls by using the engine rotation speed signal SNe with the rotational vibration due to resonance properly attenuated. The electronic control device 90 corresponds to a vehicle control device.

Figure 6:
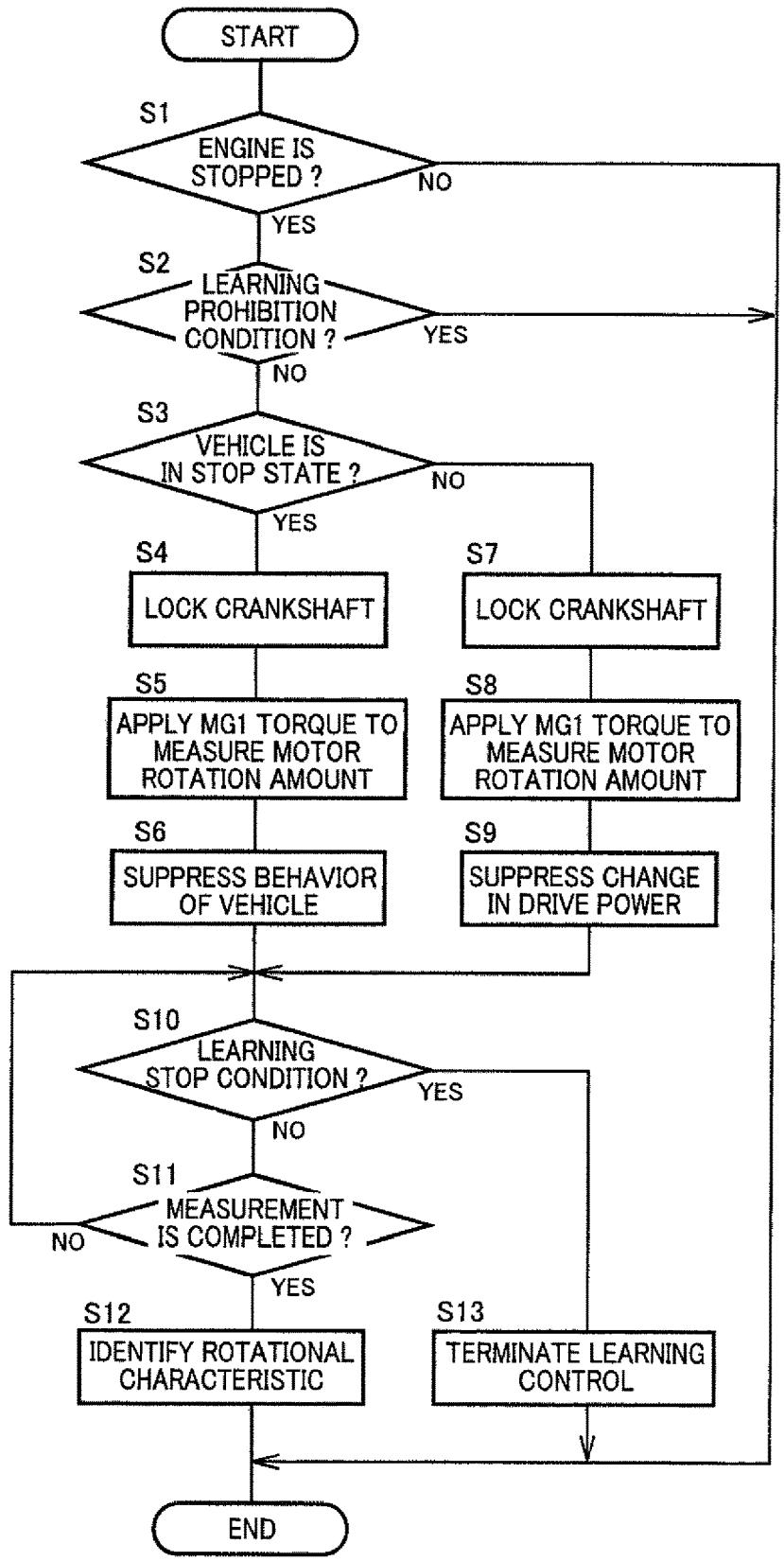
FIG. 6 is a flowchart specifically explaining a signal process executed by a characteristic learning portion of FIG. 1.

The characteristic learning portion 92 provides a learning control in accordance with steps S1 to S13 (hereinafter simply referred to as S1 to S13; steps are omitted also in the other flowcharts) of a flowchart of FIG. 6. This learning control is periodically provided under certain conditions determined based on a running distance or a running time of the hybrid vehicle 10 in this example. At S1, it is determined whether the engine 12 is stopped, and if the engine 12 is in a stop state, S2 is executed, or if the engine 12 is in operation, the control is terminated. At S2, it is determined whether a predefined learning prohibition condition is satisfied. For the learning prohibition condition, for example, (a) and (b) are defined as follows.

(a) The electric storage remaining amount SOC of the electric storage device 62 is equal to or less than a lower limit value defined in advance for ensuring restarting of the engine 12 etc.

(b) An engine start request is made (an air conditioning request, a driver's accelerator operation, etc.).

Figure 7:
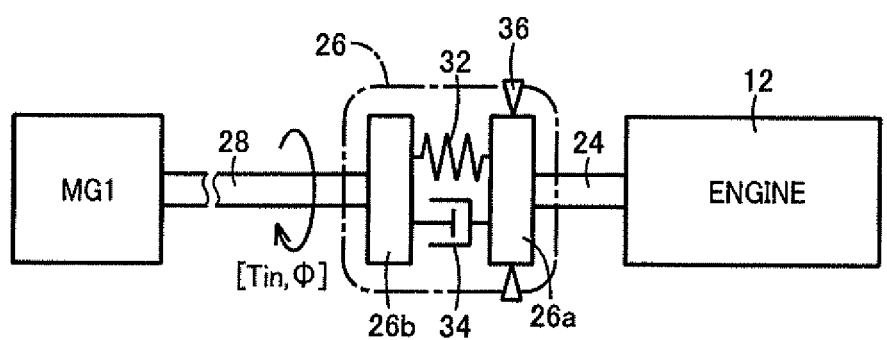
FIG. 7 is a diagram of a principle of measuring the twist angle 1 while changing the input torque Tin of the damper device at steps S4, S5 of FIG. 6.

If any one of the learning prohibition conditions is satisfied, the control is terminated, and if none is satisfied, learning is possible, so that S3 and subsequent steps are executed. At S3, it is determined whether the hybrid vehicle 10 is in a stop state, i.e., whether the vehicle speed V is 0, and if the vehicle 10 is in the stop state, S4 and subsequent steps are executed. At S4, the meshing brake 36 is engaged to lock the crankshaft 24 in a non-rotatable manner, and at S5, the first motor generator MG1 is subjected to the power running control so that the torque (the input torque Tin) is applied to the damper device 26 to measure the twist angle $\Phi$. FIG. 7 is a diagram for explaining a principle of applying the input torque Tin and measuring the twist angle 1 in this way, and the relationship as shown in FIG. 3 can be obtained by providing the power running control of the first motor generator MG1 to apply the torque (the input torque Tin) to the damper device 26 via the differential mechanism 30 while the meshing brake 36 is engaged to lock the crankshaft 24. Specifically, by measuring the MG1 rotation speed Nmg1 with the MG1 rotation speed sensor 74 such as a resolver while continuously increasing and decreasing the torque of the first motor generator MG1, the relationship between the input torque Tin and the twist angle 1 as shown in FIG. 3 can be obtained. Based on the gear ratio ρ of the differential mechanism 30, the input torque Tin can be calculated from the motor torque of the first motor generator MG1, and the twist angle 1 can be calculated from the MG1 rotation speed Nmg1. Since the relationship between the input torque Tin and the twist angle Φ of the damper device 26 of this example symmetrically changes with respect to the origin O as shown in FIG. 3, only one of the positive and negative regions may be measured. If a one-way clutch is disposed instead of the meshing brake 36 to prevent the rotation of the engine 12 only in the reverse rotation direction, the twist angle Φ may be measured such that the torque in the reverse rotation direction is applied as the input torque Tin.

S6 is executed concurrently with the execution of S5 to suppress the behavior of the vehicle 10 such that the vehicle 10 is retained in the stop state regardless of the power running control of the first motor generator MG1. Specifically, when a torque is applied to the damper device 26 by providing the power running control of the first motor generator MG1, a torque is transmitted to the output gear 40 due to a reaction force thereof so that a drive power is generated, and therefore, the behavior of the vehicle 10 caused by the drive power is restrained. More specifically, for example, if the parking range is selected and the parking lock pawl is urged to mesh with the parking gear 45, the second motor generator MG2 is subjected to the power running control to slightly rotate the intermediate shaft 42, and the parking lock pawl is thereby reliably meshed with the parking gear 45. For another means, a brake force may be generated in the wheel brake 67 by the automatic brake system 66. Alternatively, the dog clutch 43 is released to interrupt the power transmission toward the driving wheel 14 while a torque of the second motor generator MG2 is controlled to prevent the rotation of the output gear 40 so that a predetermined input torque Tin is applied to the damper device 26. In other words, the torque of the second motor generator MG2 is controlled to offset the drive power generated by the power running control of the first motor generator MG1, and this control can be provided even while the dog clutch 43 is engaged and is also applicable to a vehicle without the dog clutch 43. When the parking range is selected, the parking lock pawl is engaged with the parking gear 45 to prevent the rotation of the driving wheels 14, so that the vehicle behavior restraining control of S6 may be omitted.

When the determination of S3 is NO (negative), i.e., when the vehicle 10 is running rather than being in the stop state, S7 to S9 are executed to obtain the relationship between the input torque Tin and the twist angle Φ. Specifically, at S7 and S8, as in S4 and S5, while the crankshaft 24 is non-rotatably locked by the meshing brake 36, the first motor generator MG1 is subjected to the power running control so that the torque (the input torque Tin) is applied to the damper device 26 to measure the twist angle Φ. In this case, as shown in FIG. 2, the output gear 40 is rotated depending on the vehicle speed V, and the first motor generator MG1 is further rotated in the reverse rotation direction, so that the twist angle 1 is calculated by subtracting an amount corresponding to the rotation speed of the first motor generator MG1. During running in two-motor drive mode in which the first motor generator MG1 is also used as a drive power source, the two-motor drive is once switched to single-motor drive in which only the second motor generator MG2 is used as the drive power source, and the twist angle Φ can thereby be measured with the MG1 rotation speed sensor 74 such as a resolver while continuously increasing and decreasing the torque of the first motor generator MG1. At S9, the torque of the second motor generator MG2 is controlled to increase or decrease so as to offset the drive power generated by the power running control of the first motor generator MG1, and a change in drive power of the vehicle 10 is thereby suppressed. When the hybrid vehicle 10 is coasting, the dog clutch 43 may be released to interrupt the power transmission toward the driving wheels 14, and the torque of the second motor generator MG2 may be controlled to offset the drive power generated by the power running control of the first motor generator MG1. Even during running with a predetermined drive power, similarly, while the dog clutch 43 is released to interrupt the power transmission toward the driving wheels 14, the torque of the second motor generator MG2 may be controlled to offset the drive power generated by the power running control of the first motor generator MG1.

At S10 following S6 or S9, it is determined whether a predefined learning stop condition is satisfied. For the learning stop condition, for example, (a) to (g) are defined as follows.

(a) The electric storage remaining amount SOC of the electric storage device 62 is equal to or less than a lower limit value defined in advance for ensuring the startability of the engine 12 etc.

(b) An engine start request is made (an air conditioning request, a driver's accelerator operation, etc.).

(c) The vehicle is in a condition causing resonance (a surging torque input to tires, an uneven road, etc.).

(d) The drive power becomes insufficient (a slope, a high drive power, etc.).

(e) A motor torque must be generated for other requirements (a motor torque for eliminating a backlash or starting an engine, etc.).

(f) The motor is in a low rotation speed region (i.e., the vehicle is in a low vehicle speed region) in which a motor cogging torque is large.

(g) The vehicle is moving at the time of measurement for the vehicle stop state.

If any one of the learning stop conditions is satisfied, the learning control is stopped and terminated at S13, and if none is satisfied, S11 is executed. At S11, it is determined whether a series of measurements according to execution of S5 or S8 is completed, and 510 is repeatedly executed until the series of measurements are completed. If the series of measurements are completed without satisfying the learning stop condition of S10, the determination at S11 is YES (affirmative), and S12 is executed to identify and store (overwrite) the rotational characteristics of the damper device 26 in the characteristic storage portion 94. Specifically, from the relationship between the input torque Tin and the twist angle Φ as shown in FIG. 3 obtained by executing S5 or S8, at least the rigidity values K1 to K3 shown in FIG. 4 are extracted, and the rigidity values K1 to K3 are stored in the characteristic storage portion 94. As a result, the engine-related control portion 96 can filter the engine rotation speed signal SNe based on the new rigidity values K1 to K3 stored in the characteristic storage portion 94 so as to provide various controls by using the engine rotation speed signal SNe with the rotational vibration due to resonance attenuated.

Figure 8:
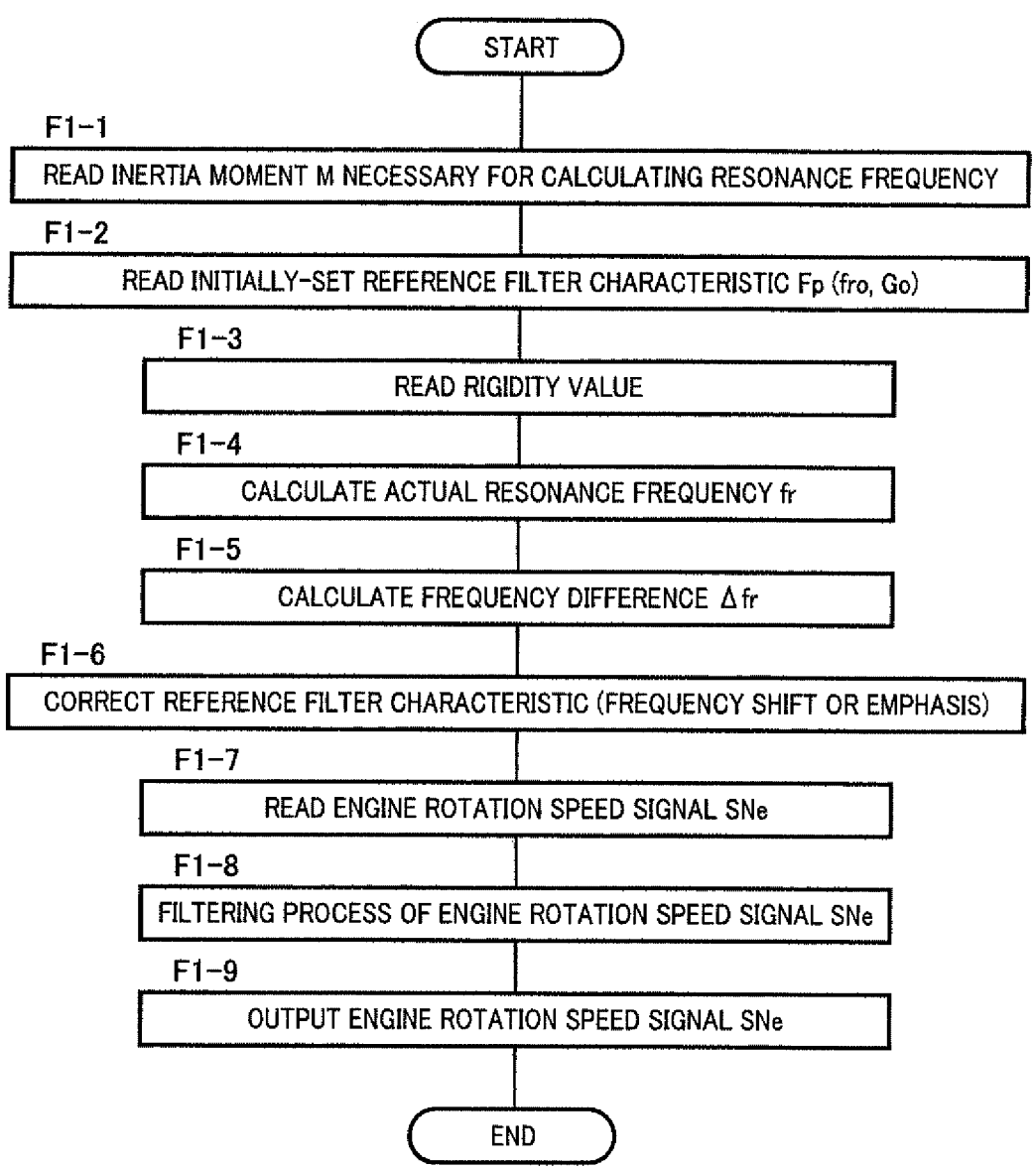
FIG. 8 is a flowchart for explaining a filtering process of the engine rotation speed signal SNe executed by a filter correcting portion and an engine rotation filtering portion of FIG. 1.

The engine-related control portion 96 provides various controls by using the engine rotation speed signal SNe and specifically functionally includes an engine rotational drive portion 100 and a misfire/abnormal-noise detecting portion 110. To attenuate the vibration component attributable to the resonance of the damper device 26 from the engine rotation speed signal SNe supplied from the engine rotation speed sensor 70, the engine rotational drive portion 100 and the misfire/abnormal-noise detecting portion 110 respectively include filter correcting portions 102, 112 and engine rotation filtering portions 104, 114. FIG. 8 is a flowchart for specifically explaining a signal process by the filter correcting portions 102, 112 and the engine rotation filtering portions 104, 114, and F1-1 to F1-6 correspond to the filter correcting portions 102, 112, while F1-7 to F1-9 correspond to the engine rotation filtering portions 104, 114. Since the filtering of the engine rotation speed signal SNe in the engine rotational drive portion 100 and the misfire/abnormal-noise detecting portion 110 differs only in filtering characteristics at the time of filtering, it will be described with reference to a common flowchart.

Figure 9:
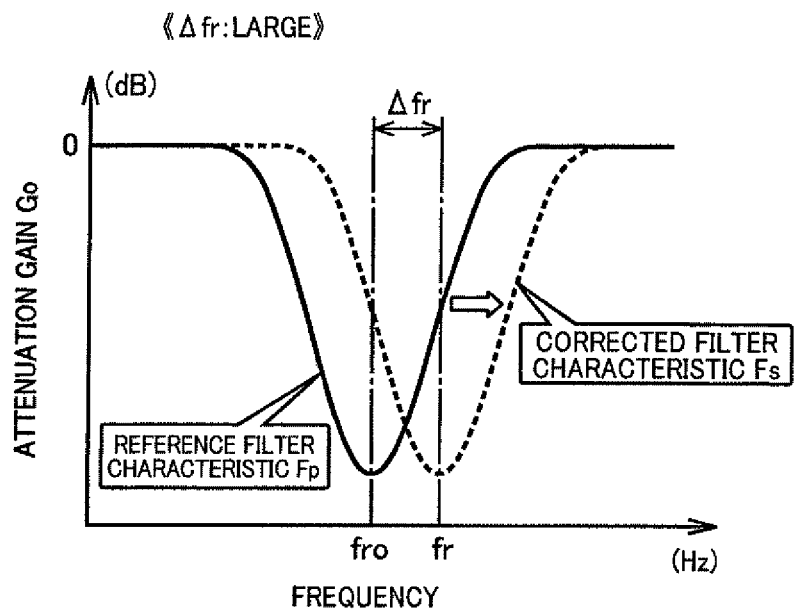
FIG. 9 is a diagram for explaining an example of correction of a reference filter characteristic (band-stop filter) for filtering the engine rotation speed signal SNe when a frequency difference Δfr is large at step F1-6 of FIG. 8.
Figure 10:
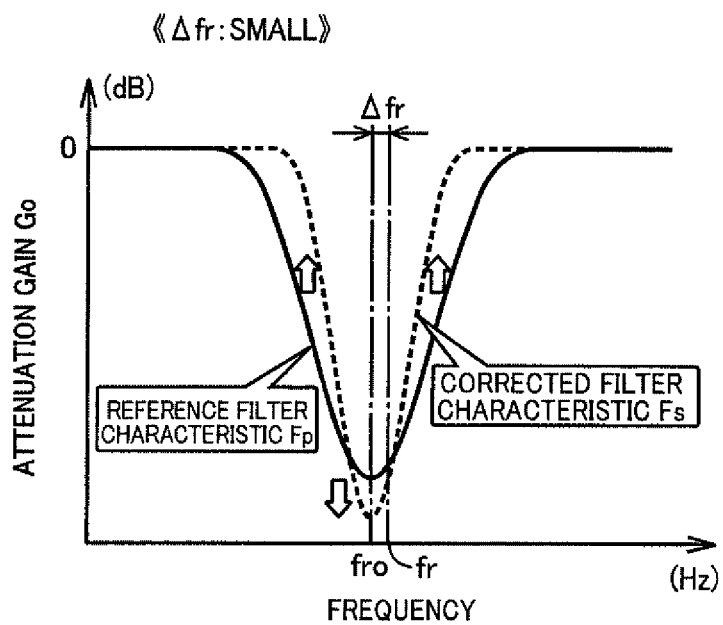
FIG. 10 is a diagram for explaining an example of correction of a reference filter characteristic (band-stop filter) for filtering the engine rotation speed signal SNe when a frequency difference Δfr is small at step F1-6 of FIG. 8.
Figure 11:
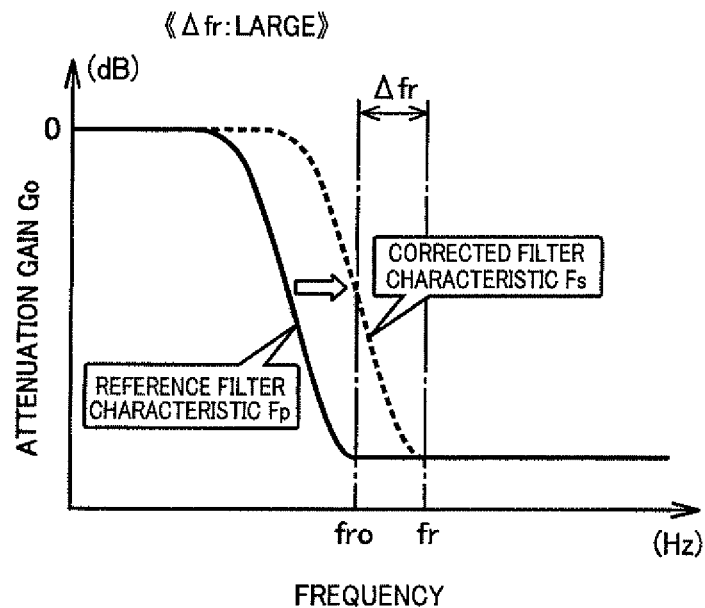
FIG. 11 is a diagram for explaining an example of correction of a reference filter characteristic (low-pass filter) different from FIG. 9 when the frequency difference Δfr is large at step F1-6 of FIG. 8.
Figure 12:
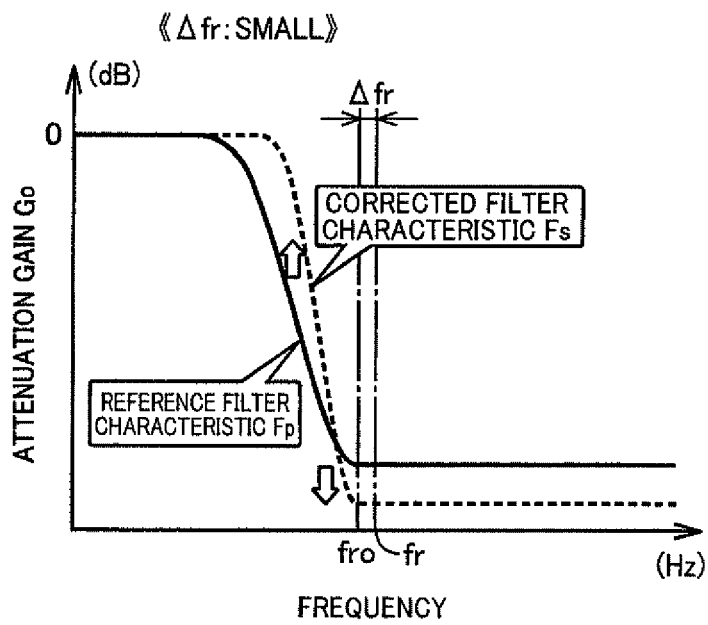
FIG. 12 is a diagram for explaining an example of correction of a reference filter characteristic (low-pass filter) different from FIG. 10 when the frequency difference Δfr is small at step F1-6 of FIG. 8.

At F1-1 of FIG. 8, an inertia moment M necessary for calculating an actual resonance frequency fr of the damper device 26 is read. The inertia moment M is preliminarily set to a constant value based on the mass, size, etc. of the engine 12, the damper device 26, a flywheel, etc. At F1-2, an initially-set reference filter characteristic Fp is read. The reference filter characteristic Fp is used for attenuating only a frequency component of rotational fluctuation attributable to resonance from an engine rotation speed signal SNe through filtering, is set based on a set resonance frequency fro defined in advance, and is defined as indicated by solid lines in FIGS. 9 to 12 in terms of an attenuation frequency band defined to include the set resonance frequency fro and an attenuation gain Go in the attenuation frequency band. FIGS. 9 and 10 show a band-stop filter having an upper limit and a lower limit defined for the attenuation frequency band, while FIGS. 11 and 12 show a low-pass filter having only the lower limit defined for the attenuation frequency band, and either one of the filters is defined depending on a purpose of use of the engine rotation speed signal SNe. For example, in the case of detecting a rotational fluctuation having a frequency higher than the resonance frequency, the band-stop filter shown in FIGS. 9 and 10 is used. The reference filter characteristic Fp is separately set for each of the engine rotational drive portion 100 and the misfire/abnormal-noise detecting portion 110, or the common reference filter characteristic Fp may be used for the engine rotational drive portion 100 and the misfire/abnormal-noise detecting portion 110. For the misfire/abnormal-noise detecting portion 110, the reference filter characteristic Fp may separately be defined for each of misfire detection and abnormal noise detection.

At F1-3, any one of the rigidity values K1 to K3 stored in the characteristic storage portion 94 is read. The rigidity values K1 to K3 to be read are determined depending on the input torque of the damper device 26 and are determined in advance in relation to the reference filter characteristic Fp. For example, in the engine rotational drive portion 100 rotationally driving the engine 12, the input torque of the damper device 26 is small, and therefore, the rigidity value K1 is read. At F1-4, the actual resonance frequency fr is calculated based on the rigidity values K1 to K3 and the inertia moment M in accordance with a map or an arithmetic expression defined in advance. At F1-5, a frequency difference Δfr between this actual resonance frequency fr and the set resonance frequency fro is calculated, and at F1-6, the reference filter characteristic Fp is corrected depending on the frequency difference Δfr. Specifically, it is determined whether the frequency difference Δfr is equal to or greater than a predefined magnitude determination value α, and if the frequency difference Δfr is equal to or greater than the magnitude determination value α, as indicated by a broken line in FIG. 9 or 11, the attenuation frequency band of the reference filter characteristic Fp is corrected by an amount corresponding to the frequency difference Δfr to move in a deviation direction of the actual resonance frequency fr. If the frequency difference Δfr is smaller than the predefined magnitude determination value α, as indicated by a broken line in FIG. 10 or 12, the attenuation gain Go of the reference filter characteristic Fp is increased and the attenuation frequency band is narrowed to make an emphasis correction. This emphasis correction is performed by increasing the attenuation gain Go in a portion near the set resonance frequency fro and continuously decreasing the attenuation gain Go in a frequency portion far from the set resonance frequency fro. In the case of the low-pass filter shown in FIG. 12, the maximum value of the attenuation gain Go may be increased, and the attenuation gain Go may continuously be decreased only on the lower limit side of the attenuation frequency band as the frequency becomes further from the set resonance frequency fro.

Subsequently, at F1-7, the engine rotation speed signal SNe is read, and at F1-8, the read engine rotation speed signal SNe is filtered in accordance with a corrected filter characteristic Fs which is obtained after the reference filter characteristic Fp is corrected at F1-6. As a result, the vibration of the engine rotation speed signal SNe due to resonance caused depending on the actual torsional rigidity of the damper device 26 is properly attenuated. Specifically, for example, as shown in FIG. 5, when the engine 12 is rotationally driven by the first motor generator MG1 to increase the engine rotation speed Ne, the rotational vibration of the engine 12 occurs due to resonance of the damper device 26 in the resonance frequency region, and therefore, the engine rotation speed signal SNe also has rotational vibration as indicated by the solid line; however, the signal SNe is filtered at F1-8 and the movement of the signal SNe is thereby properly smoothed as indicated by the broken line regardless of a variation in the torsional rigidity and/or a temporal change of the damper device 26. At F1-9, the engine rotation speed signal SNe with the rotational vibration reduced as described above is output and used for the engine rotational drive by the engine rotational drive portion 100 or the misfire detection or abnormal-noise detection by the misfire/abnormal-noise detecting portion 110.

Figure 13:
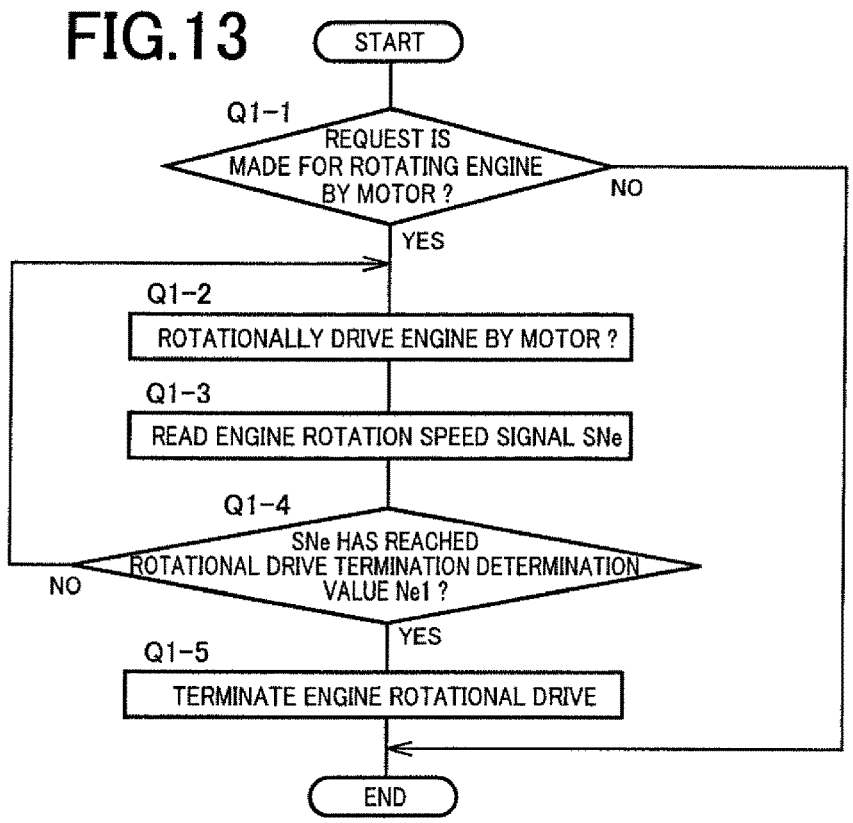
FIG. 13 is a flowchart for explaining an operation (a signal process) when an engine rotational drive portion of FIG. 1 rotationally drives the engine by using the engine rotation speed signal SNe.

FIG. 13 is a flowchart for specifically explaining an engine rotational drive control by the engine rotational drive portion 100 when the engine 12 is cranked and started by the first motor generator MG1. At Q1-1, it is determined whether an engine rotation request is supplied for cranking and starting the engine 12 by the first motor generator MG1, and if the engine rotation request is not supplied, the process is terminated, or if the engine rotation request is supplied, Q1-2 and the subsequent steps are executed. At Q1-2, the engine 12 is rotationally driven by the first motor generator MG1. Specifically, if the hybrid vehicle 10 is in the stop state, the first motor generator MG1 is rotated by the power running torque in the positive rotation direction that is the engine rotation direction, and the engine 12 can thereby rotationally be driven in the positive direction. If the hybrid vehicle 10 is in the running state, the first motor generator MG1 in the reverse rotation state is braked by applying a torque in the positive rotation direction through the regenerative control etc., and the engine 12 can thereby rotationally be driven in the positive rotation direction.

At Q1-3, the engine rotation speed signal SNe filtered by the engine rotation filtering portion 104 is read, and at Q1-4, it is determined whether the engine rotation speed Ne indicated by the engine rotation speed signal SNe has reached a predefined rotational drive termination determination value Ne1 through starting control of the engine 12 including rotational drive, ignition, fuel injection, etc. thereof. If the engine rotation speed Ne has reached the rotational drive termination determination value Ne1, Q1-5 is executed to terminate the rotational drive (cranking) of the engine 12 by the first motor generator MG1. As a result, the engine rotation speed Ne is promptly increased to the rotational drive termination determination value Ne1 higher than the resonance frequency band of the damper device 26, for example, and is subsequently increased by self-rotation of the engine 12 due to explosion to a predetermined target engine rotation speed such as an idle rotation speed. At Q1-3, the filtering process of F1-7 to F1-9 of FIG. 8 may be executed. All the signal processes of F1-1 to F1-9 including the correction of the reference filter characteristic may be executed at Q1-3.

As described above, when the engine 12 is rotationally driven for cranking via the damper device 26 by the first motor generator MG1, the engine rotation speed signal SNe after filtering is used for determining whether the engine rotation speed Ne has reached the rotational drive termination determination value Ne1, and therefore, it can highly accurately be determined that the engine rotation speed Ne has reached the rotational drive termination determination value Ne1 without being influenced by engine rotation vibration due to resonance of the damper device 26, so that the cranking by the first motor generator MG1 can properly be terminated when the engine rotation speed Ne has reached the rotational drive termination determination value Ne1. Particularly, since the engine rotation speed signal SNe supplied from the engine rotation speed sensor 70 is filtered such that the vibration component attributable to resonance is removed by the engine rotation filtering portion 104 based on the actual resonance frequency fr obtained by detecting the torsional rigidity (the rigidity values K1 to K3) of the damper device 26, whether the engine rotation speed Ne has reached the rotational drive termination determination value Ne1 can always properly be determined based on the engine rotation speed signal SNe with the vibration component attributable to resonance properly removed regardless of variations in the torsional rigidity due to individual differences and temporal changes of the damper device 26.

Figure 14:
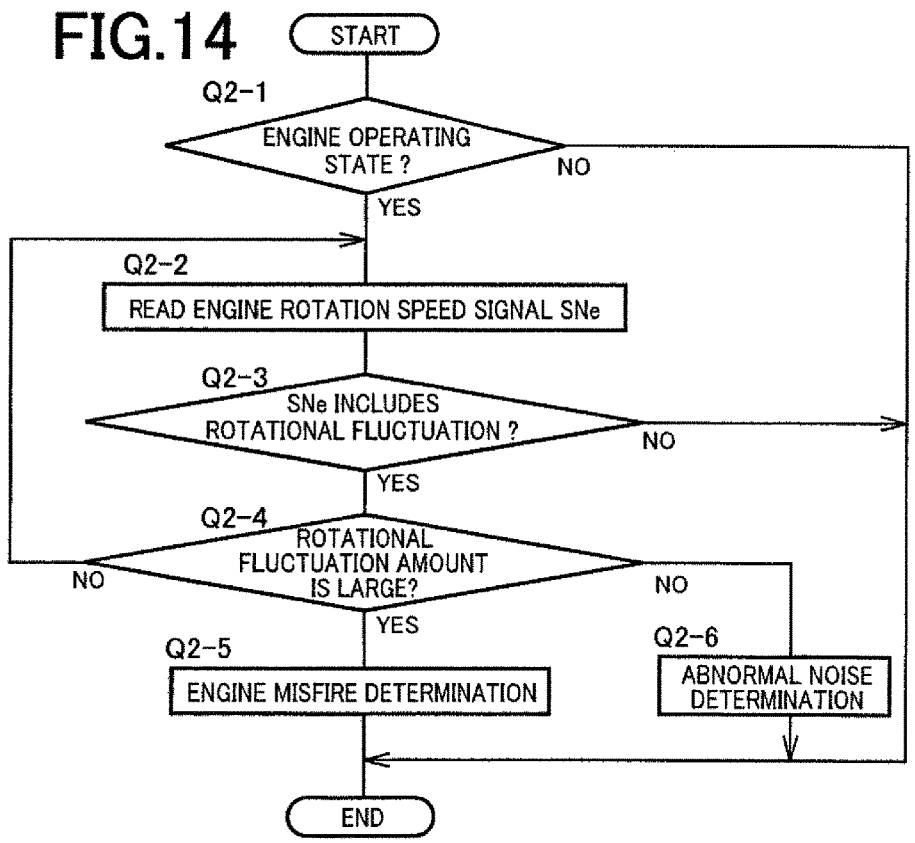
FIG. 14 is a flowchart for explaining an operation (a signal process) when a misfire/abnormal-noise detecting portion of FIG. 1 makes a misfire determination of the engine and an abnormal noise determination of a power transmission path based on the engine rotation speed signal SNe.

FIG. 14 is a flowchart for specifically explaining a misfire detection control and an abnormal noise detection control by the misfire/abnormal-noise detecting portion 110. At Q2-1, it is determined whether the engine 12 is in an operating state in which the engine 12 rotates by itself due to explosion, and if the engine 12 is not in the operating state, the process is terminated, or if the engine 12 is in the operating state, Q2-2 and the subsequent steps are executed. At Q2-2, the engine rotation speed signal SNe filtered by the engine rotation filtering portion 114 is read. At Q2-2, the filtering process of F1-7 to F1-9 of FIG. 8 may be executed. All the signal processes of F1-1 to F1-9 including the correction of the reference filter characteristic may be executed at Q2-2.

At Q2-3, it is determined whether the engine rotation speed signal SNe includes a rotational fluctuation. If no rotational fluctuation is included, i.e., if a rotational fluctuation amount ΔSNe of the engine rotation speed signal SNe is equal to or less than a predefined presence/absence determination value ΔSNe1, the process is terminated, and if ΔSNe>ΔSNe1 is satisfied, Q2-4 is executed. At Q2-4, it is determined whether the rotational fluctuation amount ΔSNe is large, i.e., whether the rotational fluctuation amount ΔSNe is equal to or greater than a predefined misfire determination value ΔSNe2, and if ΔSNe>ΔSNe2 is satisfied, a misfire determination of the engine 12 is made at Q2-5. If the engine 12 misfires, the explosion becomes irregular and generates a rotational fluctuation having a period and a magnitude different from a rotational fluctuation resulting from normal explosion, and therefore, the misfire of the engine 12 can be determined based on the rotational fluctuation amount ΔSNe. In this case, the misfire of the engine 12 can be suppressed by changing the torque Te or the engine rotation speed Ne of the engine 12, for example.

On the other hand, if the determination of Q2-4 is NO (negative), i.e., if the rotational fluctuation amount ΔSNe is small and ΔSNe<ΔSNe2 is satisfied, Q2-6 is executed to make an abnormal noise determination. If inter-cylinder torque variations etc. of the engine 12 cause a rotational vibration having a period and a magnitude different from a rotational vibration resulting from normal explosion, an abnormal noise (tapping phenomenon) such as a tooth contact sound may occur in a gear meshing portion of the power transmission path, and therefore, the abnormal noise determination can be made based on the rotational fluctuation amount ΔSNe. In this case, for example, by changing the torque Te or the engine rotation speed Ne of the engine 12, the rotational fluctuation of the engine rotation speed Ne can be reduced to suppress the occurrence of the abnormal noise.

As described above, the misfire determination and the abnormal noise determination of the engine 12 are made during the operation of the engine 12 based on the rotational fluctuation of the engine rotation speed signal SNe after filtering, so that the misfire determination and the abnormal noise determination can properly be made with high accuracy without being affected by engine rotational vibration due to resonance of the damper device 26. Particularly, since the engine rotation speed signal SNe supplied from the engine rotation speed sensor 70 is filtered such that the vibration component attributable to resonance is removed by the engine rotation filtering portion 114 based on the actual resonance frequency fr obtained by detecting the torsional rigidity (the rigidity values K1 to K3) of the damper device 26, the misfire determination and the abnormal noise determination are always properly made based on the engine rotation speed signal SNe with the vibration component attributable to resonance properly removed regardless of variations in the torsional rigidity due to individual differences and temporal changes of the damper device 26.

As described above, in the hybrid vehicle 10 of this example, the torsional rigidity (such as the rigidity value K1) is detected by applying the torque Tin to the damper device 26 through the power running control of the first motor generator MG1 to measure the twist angle Φ while the rotation of the crankshaft 24 is locked by the meshing brake 36, and the actual resonance frequency fr is calculated based on the detected torsional rigidity. Therefore, the actual resonance frequency fr can properly be calculated based on the actual torsional rigidity regardless of variations in torsional rigidity due to individual differences etc. and temporal changes of the damper device 26. The filtering is then performed to attenuate the vibration component of the actual resonance frequency fr in the engine rotation speed signal SNe supplied from the engine rotation speed sensor 70, so that the vibration component attributable to resonance is properly reduced in the obtained engine rotation speed signal SNe, and the subsequent controls using the engine rotation speed signal SNe, or specifically, the rotational drive control of the engine 12 by the engine rotational drive portion 100 and/or the misfire and abnormal noise determinations by the misfire/abnormal-noise detecting portion 110 are properly performed.

In the filtering of the engine rotation speed signal SNe, a correction is made based on the frequency difference Δfr between the actual resonance frequency fr and the set resonance frequency fro for the reference filter characteristic Fp having the attenuation frequency band and the attenuation gain Go defined in advance depending on the set resonance frequency fro, and the engine rotation speed signal SNe is filtered in accordance with the corrected filter characteristic Fs which is obtained after the correction, so that the vibration component attributable to resonance is properly reduced.

If the frequency difference Δfr between the actual resonance frequency fr and the set resonance frequency fro is large, the attenuation frequency band of the reference filter characteristic Fp is corrected to move in the deviation direction of the resonance frequency, so that the vibration component attributable to resonance is properly reduced from the engine rotation speed signal SNe even if the frequency difference Δfr is large. On the other hand, if the frequency difference Δfr between the actual resonance frequency fr and the set resonance frequency fro is small, the attenuation gain Go of the reference filter characteristic Fp is increased and the attenuation frequency band is narrowed to make an emphasis correction, and therefore, only the vibration component attributable to resonance can more properly be reduced from the engine rotation speed signal SNe.

Another example of the present invention will be described. In the following example, portions substantially the same as those in the example are denoted by the same reference numerals and will not be described in detail.

Figure 15:
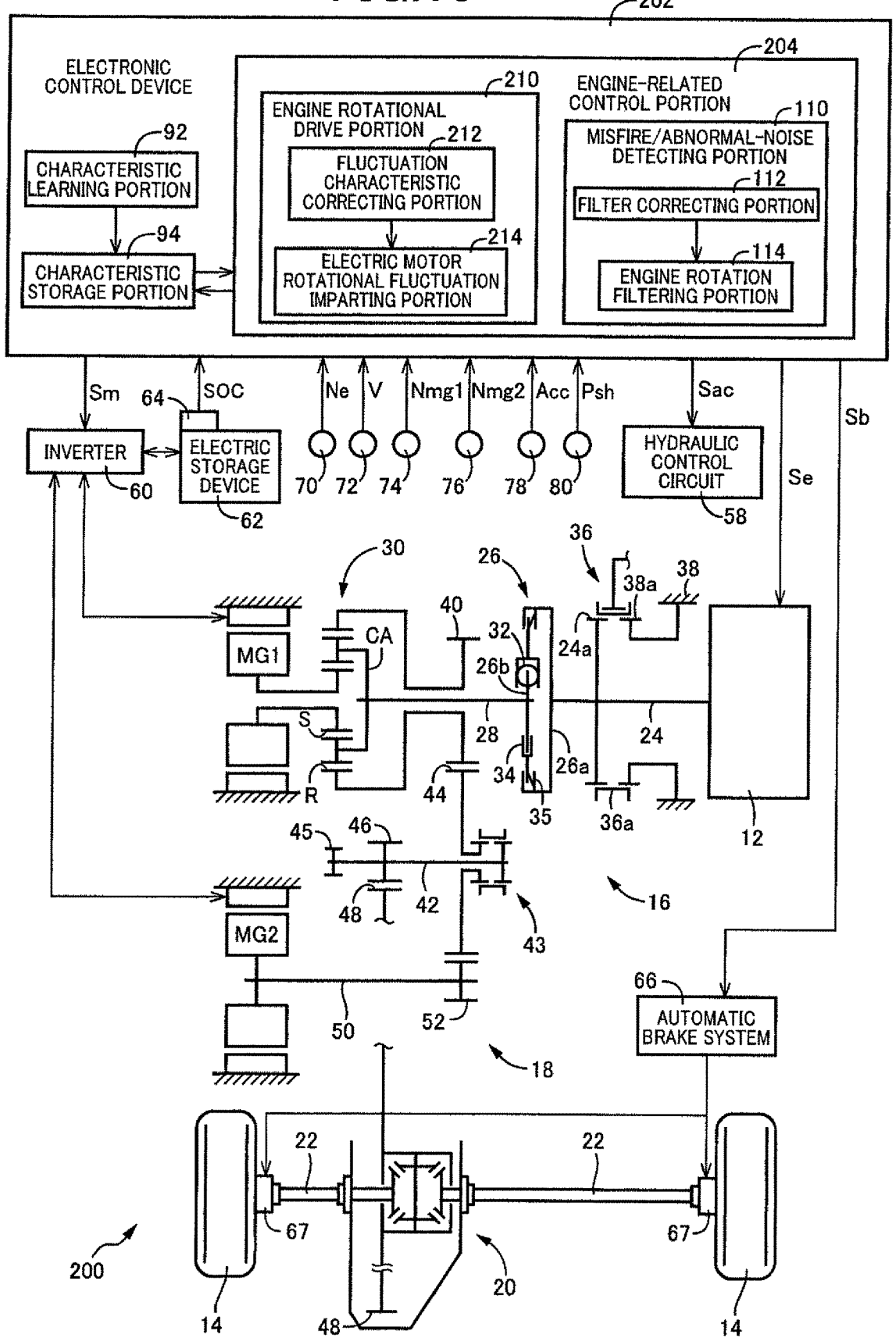
FIG. 15 is a diagram for explaining another example of the present invention and is a skeleton diagram of a hybrid vehicle corresponding to FIG. 1.

FIG. 15 is a skeleton diagram for explaining a drive system of a hybrid vehicle 200 to which the present invention is applied, showing main portions of the control system together and corresponding to FIG. 1. The hybrid vehicle 200 is different from the hybrid vehicle 10 of the above example in an engine rotational drive portion 210 in an engine-related control portion 204 functionally included in an electronic control device 202. The engine rotational drive portion 210 rotationally drives the engine 12 with the first motor generator MG1 and functionally includes a fluctuation characteristic correcting portion 212 and an electric motor rotational fluctuation imparting portion 214 so as to suppress the rotational vibration itself of the engine 12 caused by the actual resonance frequency fr of the damper device 26. The electric motor rotational fluctuation imparting portion 214 imparts a periodic fluctuation to a target rotation speed Nmg1t of the first motor generator MG1 depending on the actual resonance frequency fr of the damper device 26 so as to suppress the rotational vibration of the engine 12, and the fluctuation characteristic correcting portion 212 sets a fluctuation characteristic related to an amplitude and a fluctuation frequency band of the periodic fluctuation depending on the actual resonance frequency fr of the damper device 26.

Figure 16:
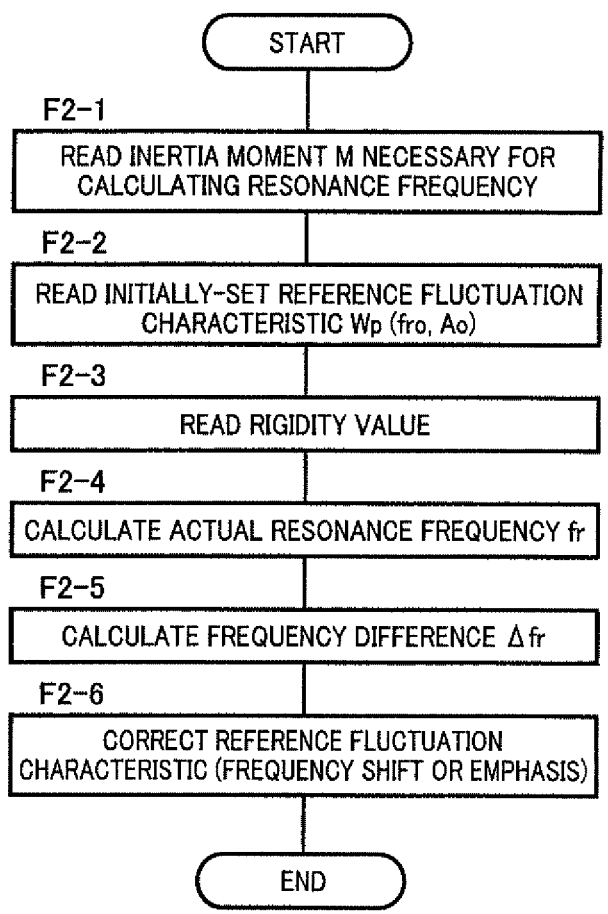
FIG. 16 is a flowchart for explaining an operation (a signal process) when a reference fluctuation characteristic defined in advance by a fluctuation characteristic correcting portion of FIG. 15 is corrected by a fluctuation characteristic correcting portion of FIG. 15 depending on an actual torsional rigidity of the damper device.
Figure 17:
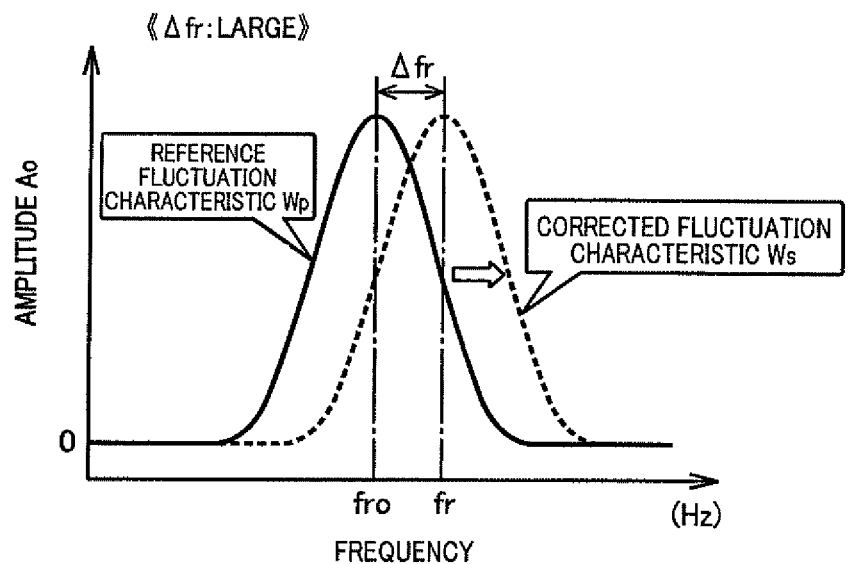
FIG. 17 is a diagram for explaining an example of correction of a reference fluctuation characteristic related to a periodic fluctuation imparted to a target rotation speed Nmg1t of a first motor generator when a frequency difference Δfr is large at step F2-6 of FIG. 16.
Figure 18:
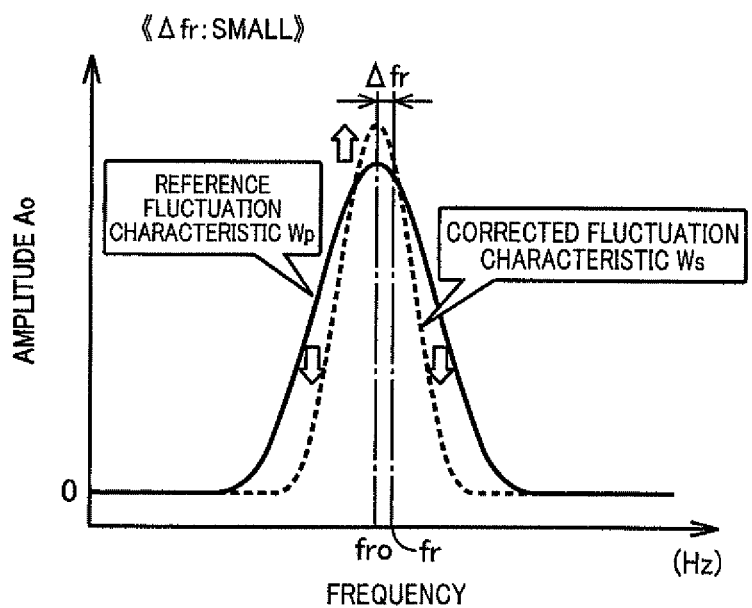
FIG. 18 is a diagram for explaining an example of correction of a reference fluctuation characteristic related to the periodic fluctuation imparted to the target rotation speed Nmg1t of the first motor generator when the frequency difference Δfr is small at step F2-6 of FIG. 16.

FIG. 16 is a flowchart for specifically explaining a signal process by the fluctuation characteristic correcting portion 212. At F2-1 of FIG. 16, similarly to F1-1 of FIG. 8, the inertia moment M necessary for calculating the actual resonance frequency fr of the damper device 26 is read. At F2-2, an initially-set reference fluctuation characteristic Wp is read. The reference fluctuation characteristic Wp is a characteristic for imparting to the MG1 target rotation speed Nmg1t a rotational fluctuation opposite in phase to the rotational vibration of the engine 12 caused by the resonance of the damper device 26, is set based on the set resonance frequency fro defined in advance, and is defined as indicated by solid lines in FIGS. 17 and 18 in terms of a fluctuation frequency band defined to include the set resonance frequency fro and an amplitude Ao within the fluctuation frequency band.

At F2-3, the rigidity value K1 stored in the characteristic storage portion 94 is read. The reference fluctuation characteristic Wp is set based on the rigidity value K1 (which is an initially-set value) in a region of a small input torque. At F2-4, similarly to F1-4, the actual resonance frequency fr is calculated based on the rigidity value K1 and the inertia moment M in accordance with a map or an arithmetic expression defined in advance. At F2-5, similarly to F1-5, the frequency difference Δfr between the actual resonance frequency fr and the set resonance frequency fro is calculated, and at F2-6, the reference fluctuation characteristic Wp is corrected depending on the frequency difference Δfr. Specifically, it is determined whether the frequency difference Δfr is equal to or greater than a predefined magnitude determination value β, and if the frequency difference Δfr is equal to or greater than the magnitude determination value β, as indicated by a broken line in FIG. 17, the fluctuation frequency band of the reference fluctuation characteristic Wp is corrected by an amount corresponding to the frequency difference Δfr to move in a deviation direction of the actual resonance frequency fr. If the frequency difference Δfr is smaller than the predefined magnitude determination value β, as indicated by a broken line in FIG. 18, the amplitude Ao of the reference fluctuation characteristic Wp is increased and the fluctuation frequency band is narrowed to make an emphasis correction. This emphasis correction is performed by increasing the amplitude Ao in a portion near the set resonance frequency fro and continuously decreasing the amplitude Ao in a frequency portion far from the set resonance frequency fro. The magnitude determination value β may be the same as the magnitude determination value α or may be defined as a different value.

Figure 19:
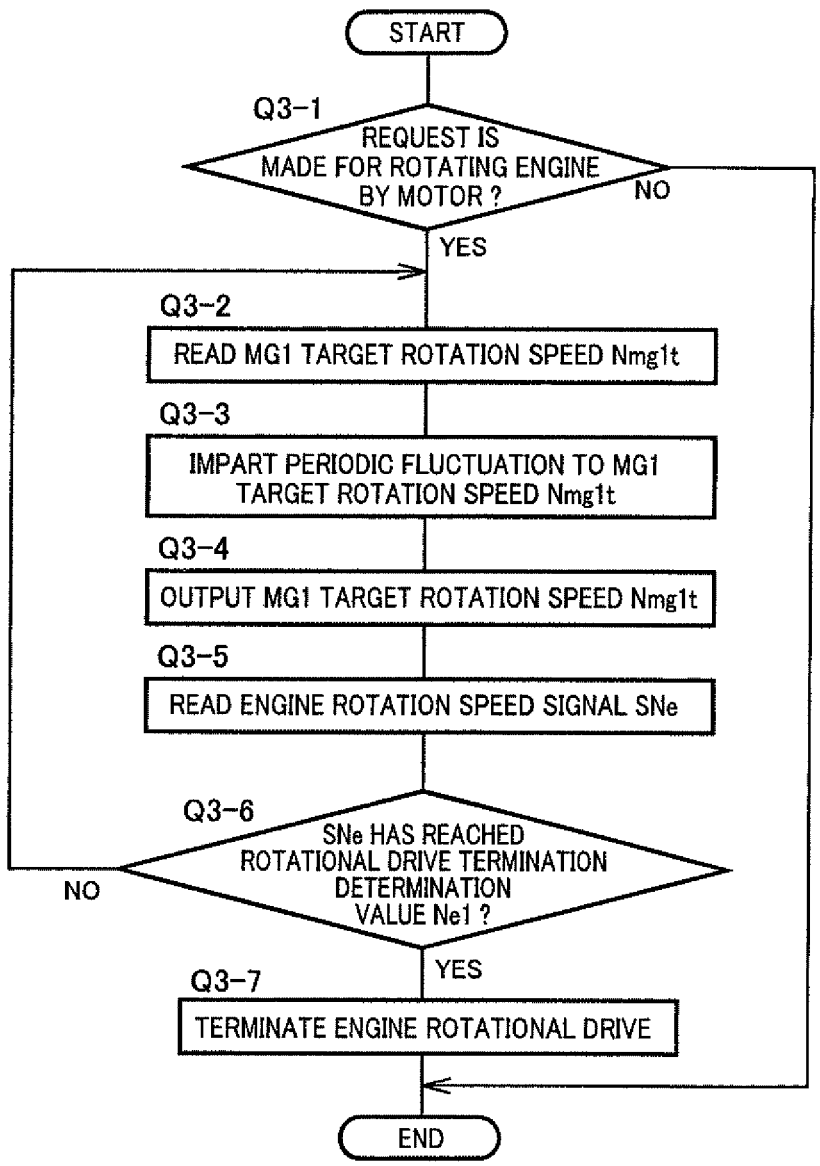
FIG. 19 is a flowchart for explaining an operation (a signal process) when an engine rotational drive portion of FIG. 15 rotationally drives the engine.

By imparting a rotational fluctuation having an opposite phase to rotational vibration of the engine 12 to the target rotation speed Nmg1t of the first motor generator MG1 in accordance with a fluctuation characteristic Ws after the correction as described above, the periodical change of the engine rotation speed Ne due to resonance caused depending on the torsional rigidity of the damper device 26 is properly suppressed regardless of variations in the actual torsional rigidity of the damper device 26 when the engine 12 is rotationally driven by the first motor generator MG1. FIG. 19 is a flowchart for specifically explaining an engine rotational drive control by the engine rotational drive portion 210 when the engine 12 is cranked and started by the first motor generator MG1, wherein the engine rotational drive control includes a control of imparting the rotational fluctuation to the target rotation speed Nmg1t in accordance with the corrected fluctuation characteristic Ws by the electric motor rotational fluctuation imparting portion 214. Q3-2 and Q3-3 of FIG. 19 correspond to the electric motor rotational fluctuation imparting portion 214.

At Q3-1 of FIG. 19, it is determined whether an engine rotation request is supplied for cranking and starting the engine 12 by the first motor generator MG1, and if the engine rotation request is not supplied, the process is terminated, or if the engine rotation request is supplied, Q3-2 and the subsequent steps are executed. At Q3-2 to Q3-4, the engine 12 is rotationally driven (cranked) by the first motor generator MG1 to start the engine 12. Specifically, if the hybrid vehicle 200 is in the stop state, the first motor generator MG1 is rotated by the power running torque in the positive rotation direction that is the engine rotation direction, and the engine 12 can thereby rotationally be driven in the positive direction. If the hybrid vehicle 200 is in the running state, the first motor generator MG1 in the reverse rotation state is braked by applying a torque in the positive rotation direction through the regenerative control etc., and the engine 12 can thereby rotationally be driven in the positive rotation direction. In this case, in this example, the MG1 target rotation speed Nmg1$t$ is read at Q3-2, and a rotational fluctuation is imparted at Q3-3 to the MG1 target rotation speed Nmg1$t$ in accordance with the corrected fluctuation characteristic Ws corrected by the fluctuation characteristic correcting portion 212. At Q3-4, the MG1 target rotation speed Nmg1$t$ with the rotational fluctuation imparted is output, and the first motor generator MG1 is operated in accordance with the MG1 target rotation speed Nmg1$t$ to rotationally drive the engine 12. At Q3-3, the reference fluctuation characteristic correction process of F2-1 to F2-6 of FIG. 16 may be performed.

Figure 20:
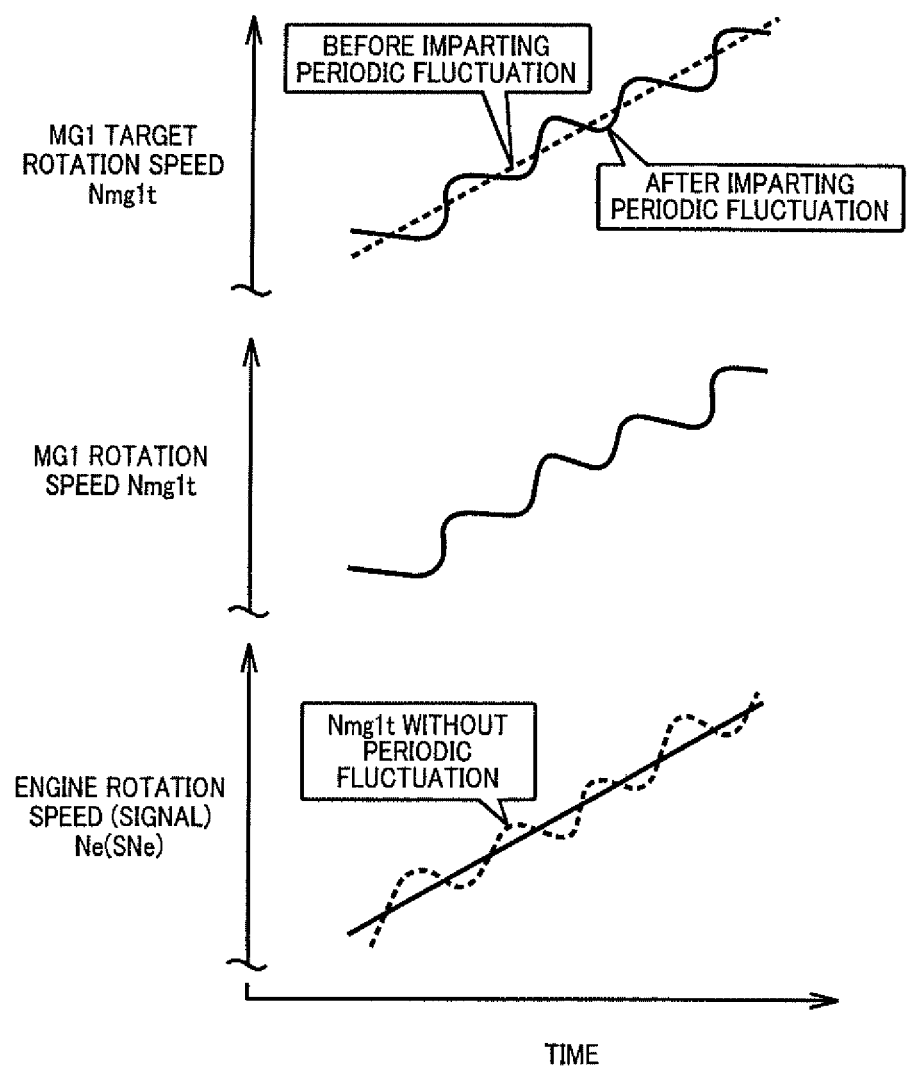
FIG. 20 is an example of a time chart showing changes in rotation speed of portions when a rotational drive control of the engine is provided in accordance with the flowchart of FIG. 19.

As described above, by imparting a rotational fluctuation to the MG1 target rotation speed Nmg1$t$ in accordance with the corrected fluctuation characteristic Ws determined depending on the actual torsional rigidity of the damper device 26, the periodic change of the engine rotation speed Ne due to resonance caused depending on the torsional rigidity of the damper device 26 can be suppressed (canceled out) regardless of the variation in torsional rigidity of the damper device 26. The phase of the rotational fluctuation imparted to the MG1 target rotation speed Nmg1$t$ is adjusted based on, for example, the engine rotation speed signal SNe supplied from the engine rotation speed sensor 70 such that the fluctuation of the engine rotation speed Ne due to resonance is reduced. FIG. 20 is an example of a time chart showing changes in the MG1 target rotation speed Nmg1$t$, the MG1 rotation speed Nmg1, and the engine rotation speed Ne when the rotational fluctuation is imparted to the MG1 target rotation speed Nmg1$t$ in accordance with the corrected fluctuation characteristic Ws in this way, and as indicated by a broken line of FIG. 20, when the engine 12 is rotationally driven by the first motor generator MG1 with the MG1 target rotation speed Nmg1$t$ without rotational fluctuation, the engine rotation speed Ne and the engine rotation speed signal SNe periodically change due to resonance. In contrast, in this example, a periodic fluctuation opposite in phase to the periodic change of the engine rotation speed Ne is imparted to the MG1 target rotation speed Nmg1$t$ in accordance with the corrected fluctuation characteristic Ws, so that the periodic change of the engine rotation speed Ne due to resonance is offset as indicated by a solid line of FIG. 20, and the engine rotation speed Ne is smoothly increased regardless of the resonance of the damper device 26. The engine rotation speed signal SNe supplied from the engine rotation speed sensor 70 also smoothly changes similarly to the engine rotation speed Ne.

Returning to FIG. 19, at Q3-5, the engine rotation speed signal SNe supplied from the engine rotation speed sensor 70 is read, and at Q3-6, it is determined whether the engine rotation speed Ne indicated by the engine rotation speed signal SNe has reached the predefined rotational drive termination determination value Ne1 through the starting control of the engine 12 including rotational drive, ignition, fuel injection, etc. If the engine rotation speed Ne indicated by the engine rotation speed signal SNe has reached the rotational drive termination determination value Ne1, Q3-7 is executed to terminate the rotational drive (cranking) of the engine 12 by the first motor generator MG1. As a result, the engine rotation speed Ne is promptly increased to the rotational drive termination determination value Ne1 higher than the resonance frequency band of the damper device 26, for example, and is subsequently increased by the self-rotation due to explosion to a predetermined target engine rotation speed such as an idle rotation speed.

As described above, when the engine 12 is rotationally driven for cranking via the damper device 26 by the first motor generator MG1, the MG1 target rotation speed Nmg1$t$ is periodically fluctuated depending on the actual resonance frequency fr to suppress the rotational vibration of the engine 12 caused by the torsional rigidity of the damper device 26, so that the rotational vibration itself of the engine rotation speed Ne due to the resonance is suppressed, and therefore, the vibration component attributable to the resonance is properly reduced in the obtained engine rotation speed signal SNe. As a result, it can highly accurately be determined that the engine rotation speed Ne has reached the rotational drive termination determination value Ne1 based on the engine rotation speed signal SNe, and when the engine rotation speed Ne reaches the rotational drive termination determination value Ne1, the cranking by the first motor generator MG1 can properly be terminated. Particularly, since the fluctuation characteristic (the corrected fluctuation characteristic Ws) of the rotational fluctuation imparted to the MG1 target rotation speed Nmg1$t$ is determined based on the actual resonance frequency fr obtained by detecting the torsional rigidity (the rigidity value K1) of the damper device 26, the periodical change of the engine rotation speed Ne due to resonance is properly suppressed regardless of variations in torsional rigidity due to individual differences and temporal changes of the damper device 26, and whether the engine rotation speed Ne has reached the rotational drive termination determination value Ne1 can always properly be determined with high accuracy based on the engine rotation speed signal SNe supplied from the engine rotation speed sensor 70 detecting the engine rotation speed Ne.

Further, the torsional rigidity (such as the rigidity value K1) is detected by applying the torque Tin to the damper device 26 through the power running control of the first motor generator MG1 to measure the twist angle 1 while the rotation of the crankshaft 24 is locked by the meshing brake 36, and the actual resonance frequency fr is calculated based on the detected torsional rigidity, so that the actual resonance frequency fr can be properly calculated based on the actual torsional rigidity regardless of variations and temporal changes of the rotational characteristics due to an individual difference etc. of the damper device 26.

Regarding the fluctuation characteristic of the periodic fluctuation for the MG1 target rotation speed Nmg1$t$, a correction is made based on the frequency difference Δfr between the actual resonance frequency fr and the set resonance frequency fro for the reference fluctuation characteristic Wp having the amplitude Ao and the fluctuation frequency band defined in advance depending on the set resonance frequency fro, and the MG1 target rotation speed Nmg1$t$ is periodically fluctuated in accordance with the fluctuation characteristic Ws after the correction, so that the rotational vibration itself of the engine rotation speed Ne due to resonance is properly suppressed, and the vibration component attributable to the resonance is properly reduced in the obtained engine rotation speed signal SNe.

If the frequency difference Δfr between the actual resonance frequency fr and the set resonance frequency fro is relatively large, the fluctuation frequency band of the reference fluctuation characteristic Wp is corrected to move in the deviation direction of the resonance frequency, so that the rotational vibration of the engine rotation speed Ne due to resonance is properly suppressed even if the frequency difference Δfr is large. On the other hand, if the frequency difference Δfr between the actual resonance frequency fr and the set resonance frequency fro is small, the amplitude Ao of the reference fluctuation characteristic Wp is increased and the fluctuation frequency band is narrowed to make an emphasis correction, and therefore, the rotational vibration of the engine rotation speed Ne due to resonance as well as the vibration of the engine rotation speed signal SNe can more properly be reduced.

Although the examples of the present invention have been described in detail with reference to the drawings, these are merely an embodiment and the present invention can be implemented in variously modified and improved forms based on the knowledge of those skilled in the art.

REFERENCE SIGNS LIST 10, 200: hybrid vehicle (vehicle) 12: engine 14: driving wheel 26: damper device (rotating member) 26a: first rotating element (coupling portion on the engine side) 36: meshing brake (rotation lock mechanism) 70: engine rotation speed sensor 90, 202: electronic control device (vehicle control device) 92: characteristic learning portion (characteristic detecting portion) 100: engine rotational drive portion 102, 112: filter correcting portion 104, 114: engine rotation filtering portion 110: misfire/abnormal-noise detecting portion (misfire detecting portion, abnormal-noise detecting portion) 210: engine rotational drive portion 212: fluctuation characteristic correcting portion 214: electric motor rotational fluctuation imparting portion MG1: first motor generator (electric motor) Tin: input torque Φ: twist angle K1, K2, K3: rigidity value (rotational characteristic, torsional rigidity) Ne: engine rotation speed SNe: engine rotation speed signal Nmg1t: MG1 target rotation speed (target rotation speed of the electric motor) fr: actual resonance frequency fro: set resonance frequency Δfr: frequency difference between the actual resonance frequency and the set resonance frequency Fp: reference filter characteristic Fs: corrected filter characteristic Wp: reference fluctuation characteristic Ws: corrected fluctuation characteristic

What is claimed is:

1. A vehicle control device for a vehicle including an engine, an electric motor, and a rotating member disposed between the engine and the electric motor with a rotational characteristic related to an input torque,
the vehicle including a rotation lock mechanism preventing rotation of a coupling portion on the engine side of the rotating member in at least one direction, and an engine rotation speed sensor detecting a rotation speed of the engine, the vehicle control device comprising:
a characteristic detecting portion detecting at least a torsional rigidity as the rotational characteristic by applying a torque to the rotating member from the electric motor to measure a twist angle of the rotating member while the rotation of the coupling portion is prevented by the rotation lock mechanism; and
an engine rotation filtering portion calculating an actual resonance frequency based on the torsional rigidity detected by the characteristic detecting portion and filtering an engine rotation speed signal supplied from the engine rotation speed sensor to attenuate a vibration component of the actual resonance frequency in the engine rotation speed signal.

2. The vehicle control device according to claim 1, comprising
a filter correcting portion making a correction based on a frequency difference between the actual resonance frequency and a predefined set resonance frequency for a reference filter characteristic related to an attenuation frequency band and an attenuation gains defined in advance depending on the set resonance frequency, wherein
the engine rotation filtering portion filters the engine rotation speed signal in accordance with a corrected filter characteristic which is obtained after the reference filter characteristic is corrected by the filter correcting portion.

3. The vehicle control device according to claim 2, wherein
when the frequency difference between the actual resonance frequency and the set resonance frequency is equal to or greater than a predefined magnitude determination value, the filter correcting portion corrects the attenuation frequency band of the reference filter characteristic to move in a deviation direction of the resonance frequency, and wherein when the frequency difference is smaller than the magnitude determination value, the filter correcting portion makes an emphasis correction by increasing the attenuation gain of the reference filter characteristic and narrowing the attenuation frequency band.

4. The vehicle control device according to claim 1, comprising
an abnormal-noise detecting portion making an abnormal noise determination of a power transmission path based on a rotational fluctuation in the engine rotation speed signal filtered by the engine rotation filtering portion during operation of the engine.

5. The vehicle control device according to claim 1, comprising
a misfire detecting portion making a misfire determination of the engine based on a rotational fluctuation in the engine rotation speed signal filtered by the engine rotation filtering portion during operation of the engine.

6. The vehicle control device according to claim 1, comprising an engine rotational drive portion providing a predefined control by using the engine rotation speed signal filtered by the engine rotation filtering portion when the engine is rotationally driven via the rotating member by the electric motor.

7. The vehicle control device according to claim 2, comprising
an abnormal-noise detecting portion making an abnormal noise determination of a power transmission path based on a rotational fluctuation in the engine rotation speed signal filtered by the engine rotation filtering portion during operation of the engine.

8. The vehicle control device according to claim 2, comprising
a misfire detecting portion making a misfire determination of the engine based on a rotational fluctuation in the engine rotation speed signal filtered by the engine rotation filtering portion during operation of the engine.

9. The vehicle control device according to claim 2, comprising an engine rotational drive portion providing a predefined control by using the engine rotation speed signal filtered by the engine rotation filtering portion when the engine is rotationally driven via the rotating member by the electric motor.

10. The vehicle control device according to claim 3, comprising
an abnormal-noise detecting portion making an abnormal noise determination of a power transmission path based on a rotational fluctuation in the engine rotation speed signal filtered by the engine rotation filtering portion during operation of the engine.

11. The vehicle control device according to claim 3, comprising
a misfire detecting portion making a misfire determination of the engine based on a rotational fluctuation in the engine rotation speed signal filtered by the engine rotation filtering portion during operation of the engine.

12. The vehicle control device according to claim 3, comprising an engine rotational drive portion providing a predefined control by using the engine rotation speed signal filtered by the engine rotation filtering portion when the engine is rotationally driven via the rotating member by the electric motor.

13. A vehicle control device for a vehicle including an engine, an electric motor, and a rotating member disposed between the engine and the electric motor with a rotational characteristic related to an input torque
the vehicle including a rotation lock mechanism preventing rotation of a coupling portion on the engine side of the rotating member in at least one direction, and an engine rotation speed sensor detecting a rotation speed of the engine, the vehicle control device comprising:
a characteristic detecting portion detecting at least a torsional rigidity as the rotational characteristic by applying a torque to the rotating member from the electric motor to measure a twist angle of the rotating member while the rotation of the coupling portion is prevented by the rotation lock mechanism; and
an electric motor rotational fluctuation imparting portion calculating an actual resonance frequency based on the torsional rigidity detected by the characteristic detecting portion and periodically fluctuating a target rotation speed of the electric motor depending on the actual resonance frequency to suppress a rotational vibration of the engine caused by the actual resonance frequency when the engine is rotated via the rotating member by the electric motor.

14. The vehicle control device according to claim 13, comprising
a fluctuation characteristic correcting portion making a correction based on a frequency difference between the actual resonance frequency and a predefined set resonance frequency for a reference fluctuation characteristic defined in advance depending on the set resonance frequency in relation to an amplitude and a fluctuation frequency band of a periodic fluctuation imparted to the target rotation speed, wherein the electric motor rotational fluctuation imparting portion periodically fluctuates the target rotation speed in accordance with a fluctuation characteristic after the reference fluctuation characteristic is corrected by the fluctuation characteristic correcting portion.

15. The vehicle control device according to claim 14, wherein
when the frequency difference between the actual resonance frequency and the set resonance frequency is equal to or greater than a predefined magnitude determination value, the fluctuation characteristic correcting portion corrects the fluctuation frequency band of the reference fluctuation characteristic to move in a deviation direction of the resonance frequency, and wherein when the frequency difference is smaller than the magnitude determination value, the fluctuation characteristic correcting portion makes an emphasis correction by increasing the amplitude of the reference fluctuation characteristic and narrowing the fluctuation frequency band.

\* \* \* \* \*